United States Patent [19]

Bahl et al.

[11] Patent Number: 4,833,712

[45] Date of Patent: May 23, 1989

[54] AUTOMATIC GENERATION OF SIMPLE MARKOV MODEL STUNTED BASEFORMS FOR WORDS IN A VOCABULARY

[75] Inventors: Lalit R. Bahl, Amawalk; Peter V. DeSouza; Robert L. Mercer, both of Yorktown Heights; Michael A. Picheny, White Plains, all of N.Y.

[73] Assignee: International Business Machines Corporation, Armonk, N.Y.

[21] Appl. No.: 738,934

[22] Filed: May 29, 1985

[51] Int. Cl.$^4$ .............................................. G10L 1/00
[52] U.S. Cl. ..................................................... 381/43
[58] Field of Search ......................... 381/43; 364/513.5

[56] References Cited

U.S. PATENT DOCUMENTS

| | | | |
|---|---|---|---|
| 4,412,098 | 10/1983 | An | 381/43 |
| 4,481,593 | 11/1984 | Bahler | 381/43 |
| 4,555,796 | 11/1985 | Sakoe | 381/43 |
| 4,587,670 | 5/1986 | Levinson et al. | 381/43 |
| 4,718,094 | 1/1988 | Bahl et al. | 381/43 |

OTHER PUBLICATIONS

W. Mendenhall "Introduction to Probability and Statistics", 5th Edition, Duxbury Press, Massachusetts, 1979, pp. 294–297.
F. Jelinek "Continuous Speech Recognition by Statistical Methods", Proceedings of the IEEE, vol. 64, No. 4, Apr. 1976.
L. R. Bahl, F. Jelinek and R. L. Mercer "Faster Acoustic Match Computation", IBM Technical Disclosure Bulletin, vol. 23, pp. 1718–1719, Sep. 1980.
L. R. Bahl, F. Jelinek and R. L. Mercer "A Maximum Likelihood Approach to Continuous Speech Recognition", Reprinted from IEEE Transactions on Pattern Analysis and Machine Intelligence, vol. PAMI-5, No. 2, Mar. 1983.
"Composite Fenemic Phones", Research Disclosure, No. 265, Aug. 1985, p. 418, Emsworth, Hampshire, GB, disclosed anonymously.

Primary Examiner—Gary V. Harkcom
Assistant Examiner—Christopher H. Lynt
Attorney, Agent, or Firm—Marc A. Block; Marc D. Schechter

[57] ABSTRACT

In a system that (i) defines each word in a vocabulary by a fenemic baseform of fenemic phones, (ii) defines an alphabet of composite phones each of which corresponds to at least one fenemic phone, and (iii) generates a string of fenemes in response to speech input, the method provides for converting a word baseform comprised of fenemic phones into a stunted word baseform of composite phones by (a) replacing each fenemic phone in the fenemic phone word baseform by the composite phone corresponding thereto; and (b) merging together at least one pair of adjacent composite phones by a single composite phone where the adverse effect of the merging is below a predefined threshold.

24 Claims, 23 Drawing Sheets

STAGES FOR STACKING "TO BE OR NOT TO BE"

FREQUENCY IN CYCLES PER SECOND

PHONS

DETAILED MATCH LATTICE

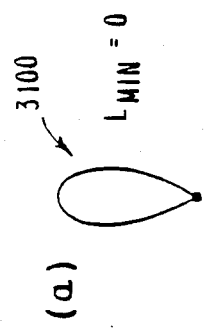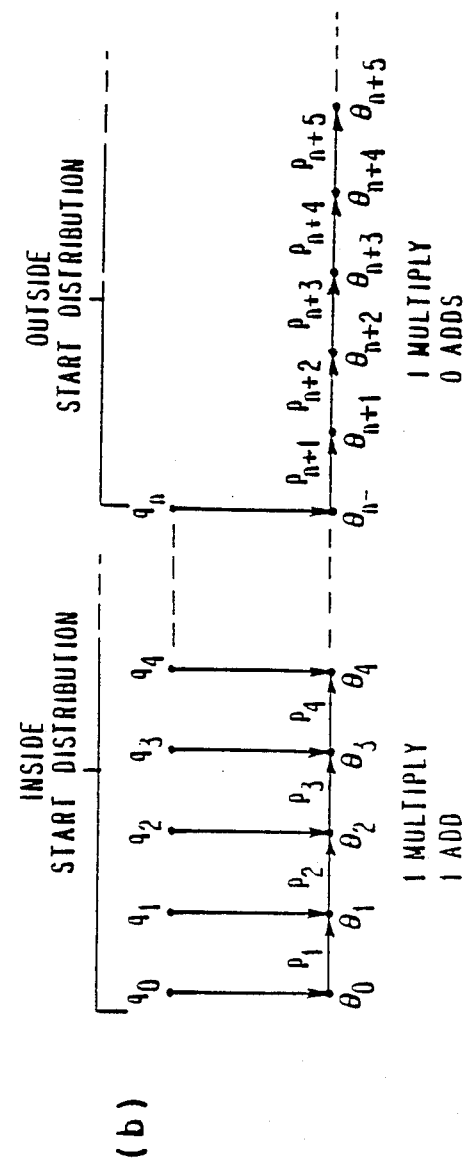
FIG. 18

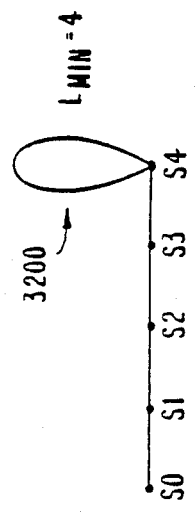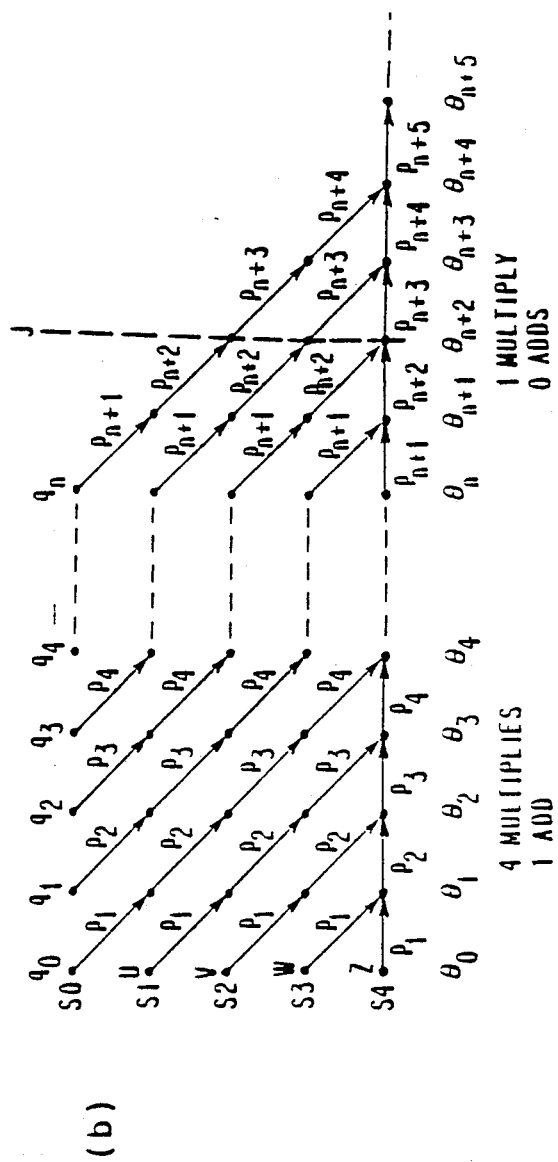
FIG. 19

$P_1$ $P_1$ $P_3$ $P_4$ $P_2$ ----$P_4$  FIG. 25

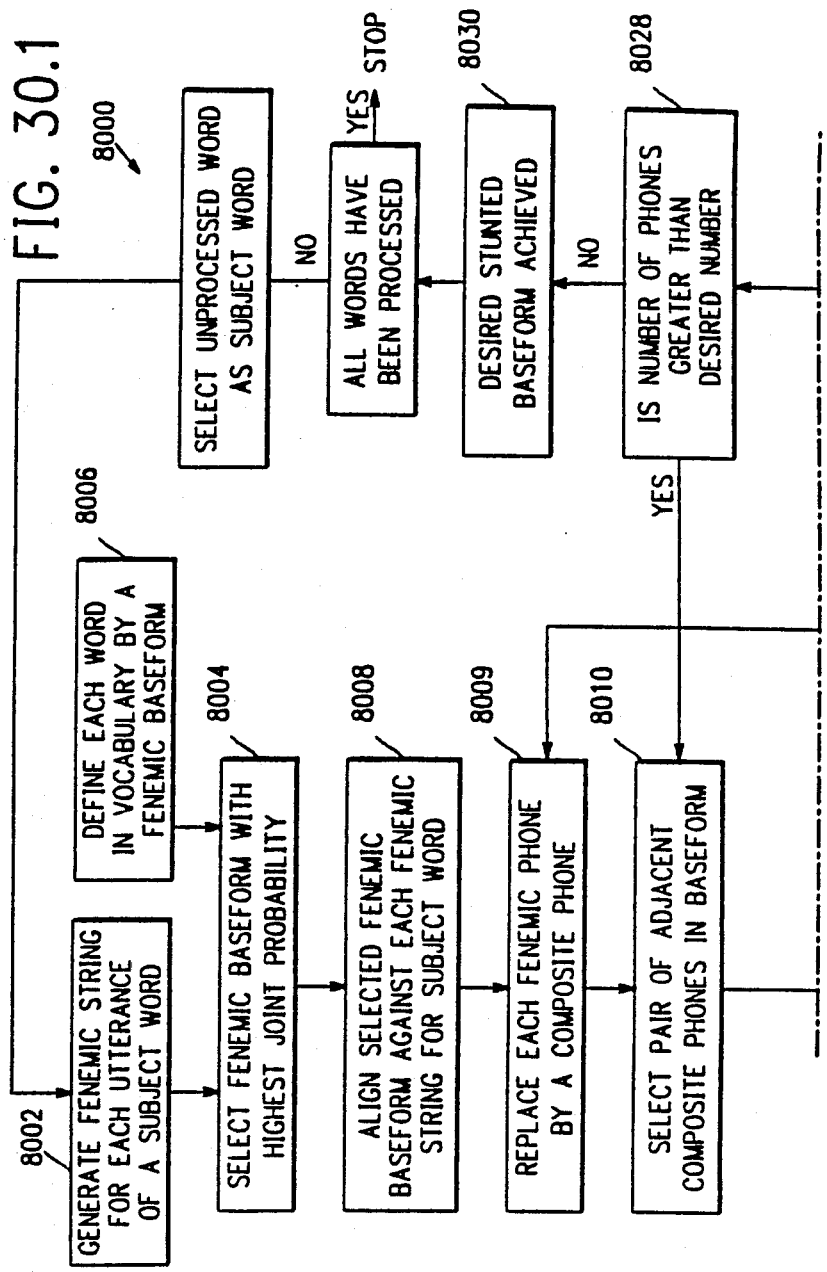
FIG. 30.1

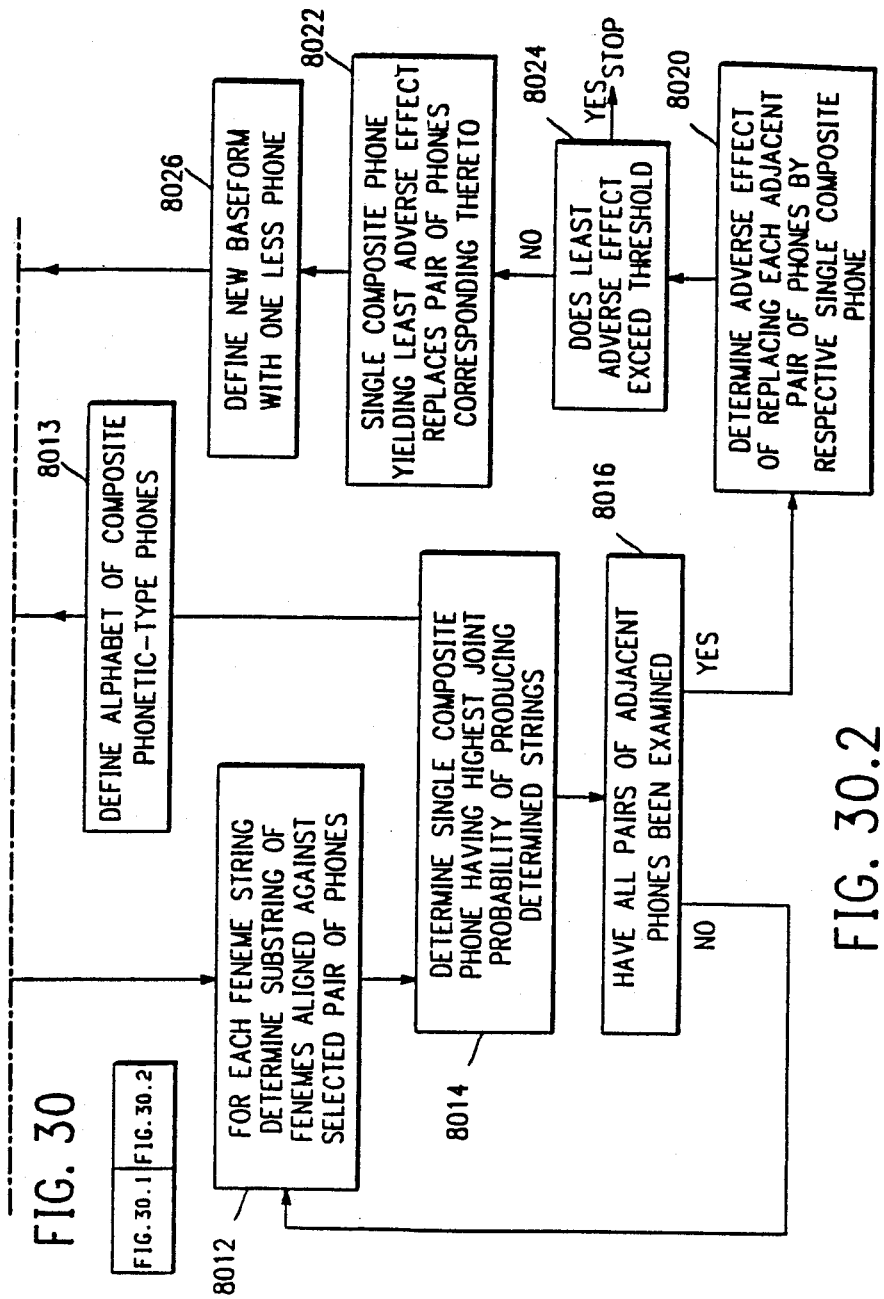

AUTOMATIC GENERATION OF SIMPLE MARKOV MODEL STUNTED BASEFORMS FOR WORDS IN A VOCABULARY

FIELD OF THE INVENTION

The present invention relates to the field of generating acoustic models for words in a vocabulary. The acoustic models are primarily for use in speech recognition applications, however may be embodied in phonetic applications where the description of a word's pronunciation is sought.

DESCRIPTION OF PRIOR AND CONTEMPORANEOUS ART

The following cases relate to inventions which provide background or environment for the present invention: "Nonlinear Signal Processing in a Speech Recognition System", Ser. No. 06/665401 filed Oct. 26, 1984; "Speech Recognition System", U.S. Pat. No. 4718094; and "Feneme-based Markov Models for Words", Ser. No. 06/697174 filed Feb. 1, 1985.

In a probabilistic approach to speech recognition, an acoustic waveform is initially transformed into a string of labels, or fenemes, by an acoustic processor. The labels, each of which identifies a sound type, are selected from an alphabet of typically approximately 200 different labels. The generating of such labels has been discussed in various articles and in the patent application entitled "Nonlinear Signal Processing in a Speech Recognition System".

In employing the labels to achieve speech recognition, Markov model (or probabilistic finite-state) machines have been discussed. A Markov model normally includes a plurality of states and transitions between the states. In addition, the Markov model normally has probabilities assigned thereto relating to (a) the probability of each transition occurring and (b) the respective probability of producing each label at various transitions. The Markov model, or Markov source, has been described in various articles such as "A Maximum Likelihood Approach to Continuous Speech Recognition", *IEEE Transactions on Pattern Analysis and Machine Intelligence*, volume PAMI-5, Number 2, March 1983, by L. R. Bahl, F. Jelinek, and R. L. Mercer.

In recognizing speech, a matching process is performed to determine which word or words in the vocabulary has the highest likelihood of having produced the string of labels generated by the acoustic process. One such matching procedure is set forth in the co-pending application entitled "Apparatus and Method for Performing Acoustic Matching". As set forth therein, acoustic matching is performed by (a) characterizing each word in a vocabulary by a sequence of Markov model phone machines and (b) determining the respective likelihood of each word-representing sequence of phone machines producing the string of labels generated by the acoustic processor. Each word-representing sequence of phone machines is referred to as a word baseform.

In defining the word baseforms, it is first necessary to define the nature of the phone machines used in constructing the baseforms. In the co-pending application entitled "Feneme-based Markov Models for Words", words are represented by feneme-based baseforms. That is, for each of 200 fenemes in a feneme alphabet, a Markov model is provided which indicates the probability of a particular feneme producing zero, one, or more fenemes (as generated by the acoustic processor) when spoken. The Markov model phone machine for a given feneme has a probability of producing no feneme or fenemes other than the given feneme due to variations in pronunciation from one utterance to another. With the fenemic baseform, the number of phone machines in each word baseform is approximately equal to the number of fenemes per word. Typically, there are 60 to 100 fenemes per word, where fenemes are preferably generated by the acoustic processor at the rate of 1 per centisecond.

Alternatively, as discussed in the application entitled "Apparatus and Method for Performing Acoustic Matching", the word baseform may be constructed of phonetic phone machines. In this instance, each phone machine corresponds to a phonetic sound and includes seven states and thirteen transitions.

The fenemic phone machine is constructed with two states and is readily determined automatically. However, the fenemic baseform has a considerable length which results in lengthy computations in the matching process. The phonetic baseform, on the other hand, is shorter and less computationally demanding; however is less precise and is not readily determined automatically in that it typically requires human input from a phonetician.

Although effective and useful, both the fenemic baseform and the phonetic baseform have disadvantages which render them less than optimal in various uses.

SUMMARY OF THE INVENTION

It is, therefore, an object of the present invention to provide a baseform which significantly avoids the disadvantages of the fenemic baseform and phonetic baseform while, at the same time, including major benefits of each.

Moreover, it is an object of the invention to automatically form short simplified phonetic-type Markov model word baseforms.

In accordance with the invention, it is presumed that each word in the vocabulary is defined by an existing fenemic baseform. It is also presumed that an alphabet of composite phones has been derived. Preferably the composite phones are chosen to be similar to elements in a phoneme alphabet. In this preferred case, each phone machine corresponds to an element of the phoneme alphabet and stores transition and label probabilities that are used in matching the phoneme element to the fenemes in a string of fenemes.

There may be less elements in the composite phone alphabet than in the fenemic phone alphabet.

The simplified baseform achieved by the present invention is constructed of composite phones in the following way.

A subject word is uttered once or, preferably, a plurality of times. With each utterance a string of fenemes is generated. Based on the string or strings of fenemes generated for the subject word, a fenemic word baseform having the highest (joint) probability of producing the string(s) is selected. Each string for the subject word is then aligned against the fenemic baseform. In this way, each fenemic phone in the fenemic baseform is aligned against corresponding fenemes in each string (for the subject word). Each fenemic phone in the fenemic word baseform is replaced by the composite phone corresponding thereto, thereby forming a composite phone baseform. The following steps are then performed:

1. A pair of adjacent composite phones is selected.
2. For each string of fenemes, the substring of fenemes that is aligned against the selected pair of adjacent composite phones is determined.
3. The one composite phone having the highest joint probability of producing the respective determined substrings for all the strings of fenemes is determined.
4. Steps 1 through 3 are repeated for all pairs of adjacent composite phones, a single composite phone being determined for each pair.
5. The adverse effect of replacing each pair of composite phones in the baseform by the single composite phone determined therefor is measured.
6. The single composite phone yielding the least adverse effect replaces the pair of phones corresponding thereto.
7. After the single composite phone replaces the pair of composite phones corresponding thereto, a new baseform of composite phone is provided.
8. Steps 1 through 7 are repeated for the new baseform.

Step 8 is repeated so often as desired to reduce the composite phone baseform to a desired length or until the adverse effect of replacing the common pairs in a set exceeds a threshold.

It is thus an object of the invention to provide a baseform for a subject word which is reduced in length relative to a fenemic baseform for the same subject word and is therfore "stunted", which is accurate, and which is characterized as a phonetic-type baseform.

Moreover, when the composite phone alphabet is selected to conform to a given phoneme alphabet, the stunted baseform generated by the present invention provides a phonetic representation of the word which may be used in applications relating to phonetics.

BRIEF DESCRIPTION OF THE DRAWINGS

FIG. 18 (a) is a diagram showing a particular phone machine of minimum length zero of FIG. 18 (b) is a time diagram corresponding thereto.

FIG. 19 (a) is a phone machine corresponding to a minimum length fourth and FIG. 19 (b) is a time diagram corresponding thereto.

FIG. 25 is an illustration showing the fenemic baseform having the highest joint probability of having produced the feneme strings in FIG. 24, the fenemic baseform comprising a sequence of fenemic phones.

FIG. 30 is a composite of FIGS. 30.1 and 30.2 which represent a flowchart of the present invention.

DESCRIPTION OF A PREFERRED EMBODIMENT OF THE INVENTION

(I) Speech Recognition System Environment

A. General Description

Figure 1:
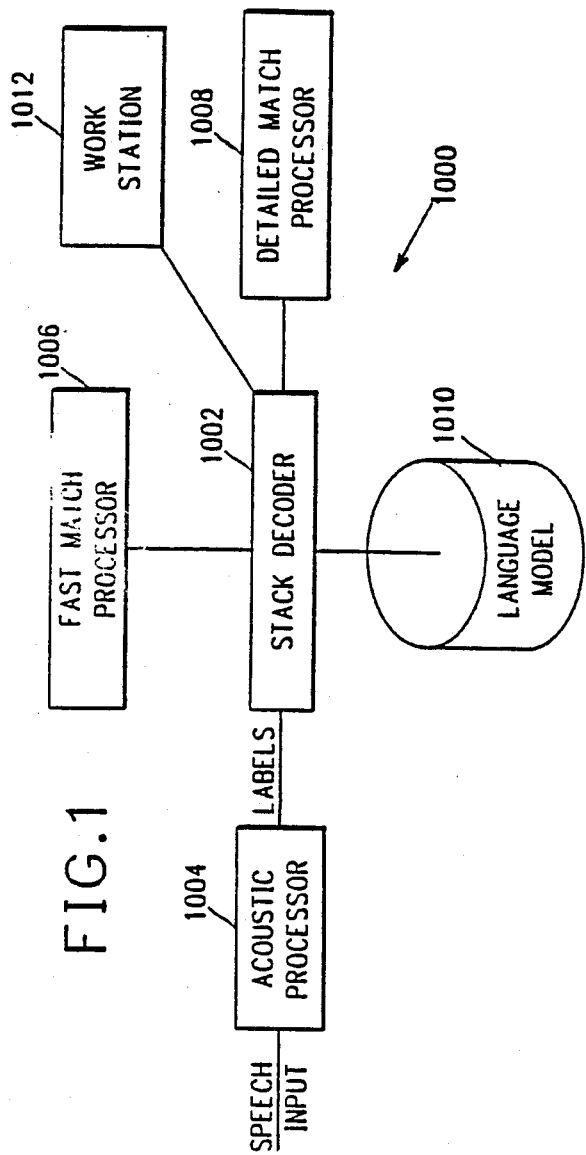
FIG. 1 is a general block diagram of a system environment in which the present invention may be practiced.

In FIG. 1, a general block diagram of a speech recognition system 1000 is illustrated. The system 1000 includes a stack decoder 1002 to which are connected an acoustic processor (AP) 1004, an array processor 1006 used in performing a fast approximate acoustic match, an array processor 1008 used in performing a detailed acoustic match, a language model 1010, and a work station 1012.

The acoustic processor 1004 is designed to transform a speech waveform input into a string of labels, or fenemes, each of which in a general sense identifies a corresponding sound type. In the present system, the acoustic processor 1004 is based on a unique model of the human ear. and is described in the above-mentioned application entitled "Nonlinear Signal Processing in a Speech Recognition System".

Figure 2:
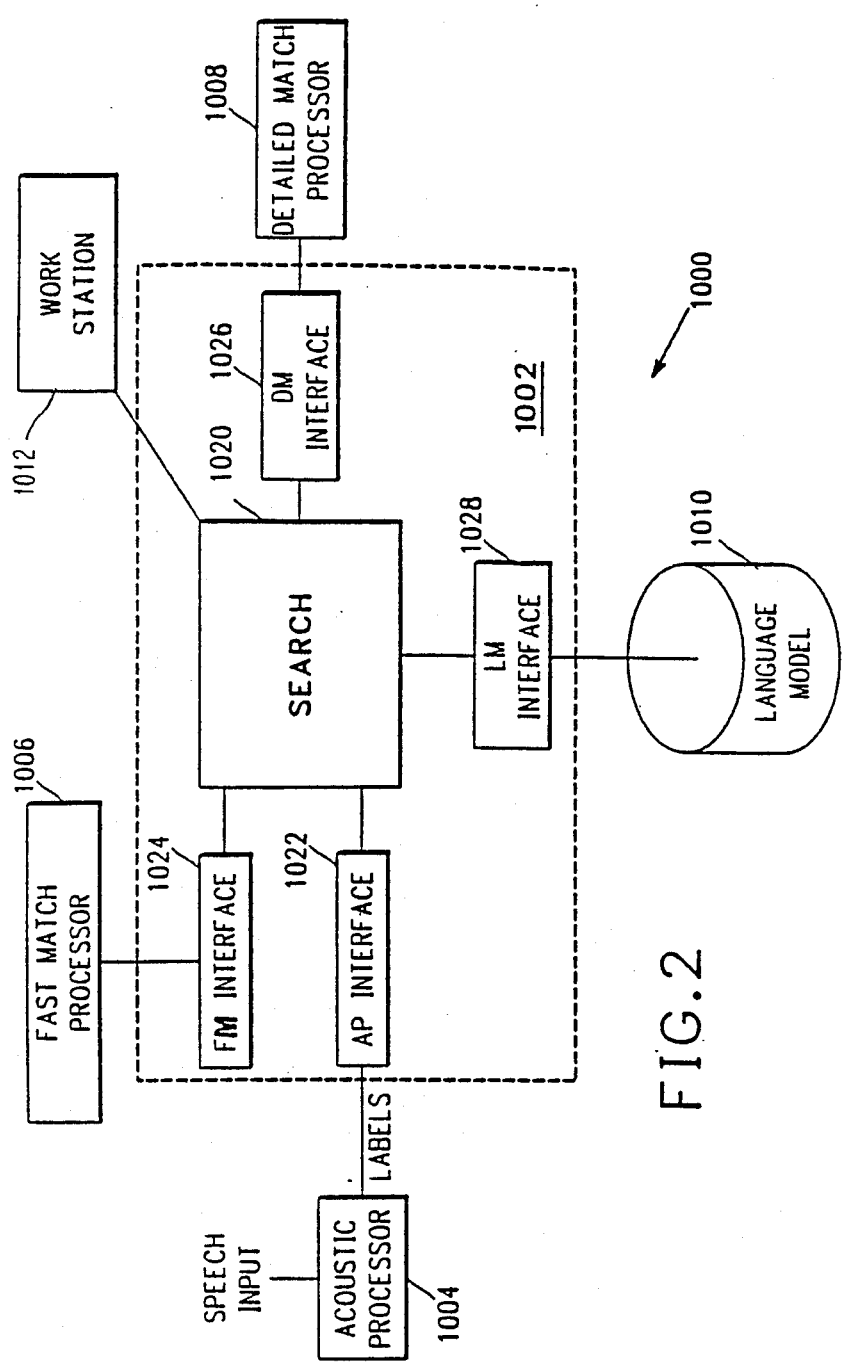
FIG. 2 is a block diagram of the system environment of FIG. 1 wherein the stack decoder is shown in greater detail.

The labels, or fenemes, from the acoustic processor 1004 enter the stack decoder 1002. In a logic sense, the stack decoder 1002 may be represented by the elements shown in FIG. 2. That is, the stack decoder 1002 includes a search element 1020 which communicates with the work station 1012 and which communicates with the acoustic processor process, the fast match processor process, the detailed match process, and the language model process through respective interfaces 1022, 1024, 1026, and 1028.

In operation, fenemes from the acoustic processor 1004 are directed by the search element 1020 to the fast match processor 1006. The fast match procedure is described hereinbelow as well as in the application entitled "Apparatus and Method for Performing Acoustic Matching". Briefly, the object of matching is to determine the most likely word (or words) for a given string of labels.

The fast match is designed to examine words in a vocabulary of words and to reduce the number of candidate words for a given string of incoming labels. The fast match is based on probabilistic finite state machines, also referred to herein as Markov models.

Once the fast match reduces the number of candidate words, the stack decoder 1002 communicates with the language model 1010 which determines the contextual likelihood of each candidate word in the fast match candidate list based preferably on existing tri-grams.

Preferably, the detailed match examines those words from the fast match candidate list which have a reasonable likelihood of being the spoken word based on the language model computations. The detailed match is discussed in the above-mentioned application entitled "Apparatus and Method for Performing Acoustic Matching".

Figure 3:
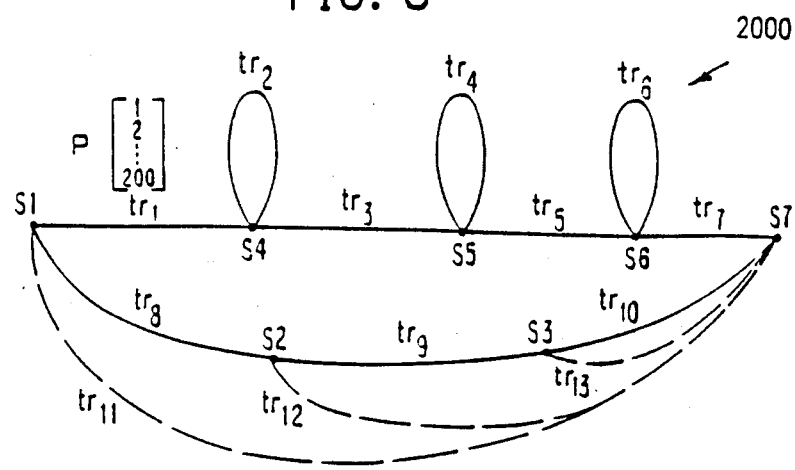
FIG. 3 is an illustration of a detailed match phone machine which is identified in storage and represented therein by statistics obtained during a training session.

The detailed match is performed by means of Markov model phone machines such as the machine illustrated in FIG. 3.

After the detailed match, the language model is, preferably, again invoked to determine word likelihood. The stack decoder 1002 of the present invention—using information derived from the fast matching, detailed matching, and applying the language model—is designed to determine the most likely path, or sequence, of words for a string of generated labels.

Two prior art approaches for finding the most likely word sequence are Viterbi decoding and single stack decoding. Each of these techniques are described in the article entitled "A Maximum Likelihood Approach to Continuous Speech Recognition." Viterbi decoding is described in section V and single stack decoding in section VI of the article.

In the single stack decoding technique, paths of varying length are listed in a single stack according to likelihood and decoding is based on the single stack. Single stack decoding must account for the fact that likelihood is somewhat dependent on path length and, hence, normalization is generally employed.

The Viterbi technique does not requires normalization and is generally practical for small tasks.

As another alternative, decoding may be performed with a small vocabulary system by examining each possible combination of words as a possible word sequence and determining which combination has the highest probability of producing the generated label string. The computational requirements for this technique become impractical for large vocabulary systems.

The stack decoder 1002, in effect, serves to control the other elements but does not perform many computations. Hence, the stack decoder 1002 preferably includes a 4341 running under the IBM VM/370 operating system as described in publications such as *Virtual Machine/System Product Introduction Release* 3 (1983). The array processors which perform considerable computation have been implemented with Floating Point System (FPS) 190L's, which are commercially available.

A novel technique which includes multiple stacking and a unique decision strategy has been inverted by L. R. Bahl, F. Jelinek, and R. L. Mercer. This technique is suggested in FIG. 4, FIG. 5, and FIG. 6.

Figure 5:
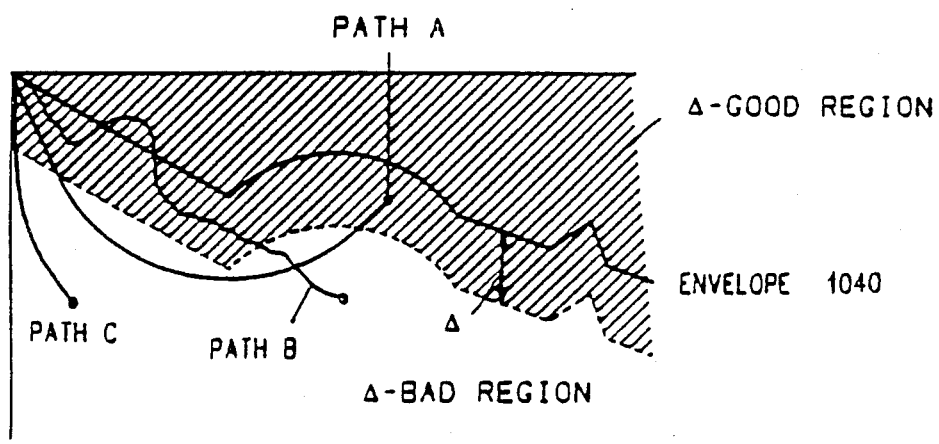
FIG. 5 is a graph depicting likelihood vectors for respective word paths and a likelihood envelope.
Figure 4:
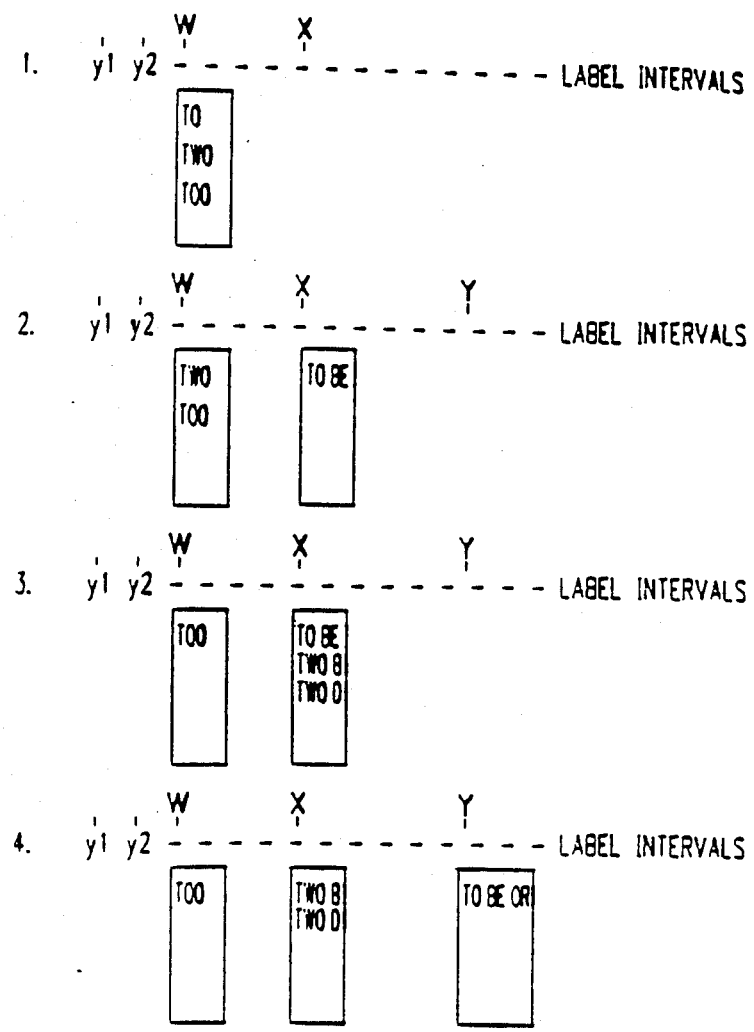
FIG. 4 is an illustration showing successive steps of stack decoding.

In FIG. 4 and FIG. 5, a plurality of successive labels $y_0 y_1$—are shown generated at successive "label intervals".

Also shown in FIG. 5 are a plurality of word paths, namely path A, path B, and path C. In the context of FIG. 4, path A could correspond to the entry "to be or", path B to the entry "two b", and path C to the entry "too". For a subject word path, there is a label (or equivalently a label interval) at which the subject word path has the highest probability of having ended—such label being referred to as a "boundary label".

For a word path W representing a sequence of words, a most likely end time—represented in the label string as a "boundary label" between two words—can be found by known methods such as that described in an article entitled "Faster Acoustic Match Computation" (by L. R. Bahl, F. Jelinek, and R. L. Mercer) in the *IBM Technical Disclosure Bulletin* volume 23, number 4, September 1980. Briefly, the article discusses methodology for addressing two similar concerns: (a) how much of a label string Y is accounted for by a word (or word sequence) and (b) at which label interval does a partial sentence—corresponding to a part of the label string—end.

For any given word path, there is a "likelihood value" associated with each label or label interval, including the first label of the label string through to the boundary label. Taken together, all of the likelihood values for a given word path represent a "likelihood vector" for the given word path. Accordingly, for each word path there is a corresponding likelihood vector. Likelihood values $L_t$ are illustrated in FIG. 5.

A "likelihood envelope" $\Lambda_t$ at a label interval t for a collection of word paths $W^1, W^2, \ldots, W^s$ is defined mathematically as:

$$\Lambda_t = \max(L_t(W^1), \cdots, L_t(W^s))$$

That is, for each label interval, the likelihood envelope includes the highest likelihood value associated with any word path in the collection. A likelihood envelope 1040 is illustrated in FIG. 5.

A word path is considered "complete" if it corresponds to a complete sentence. A complete path is preferably identified by a speaker entering an input, e.g. pressing a button, when he reaches the end of a sentence. The entered input is synchronized with a label interval to mark a sentence end. A complete word path cannot be extended by appending any words thereto. A "partial" word path corresponds to an incomplete sentence and can be extended.

Partial paths are classified as "live" or "dead". A word path is "dead" if it has already been extended and "live" if it has not. With this classification, a path which has already been extended to form one or more longer extended word paths is not reconsidered for extension at a subsequent time.

Each word path is also characterizable as "good" or "bad" relative to the likelihood envelope. The word path is good if, at the label corresponding to the boundary label thereof, the word path has a likelihood value which is within Δ of the maximum likelihood envelope. Otherwise the word path is marked as "bad". Preferably, but not necessarily, Δ is a fixed value by which each value of the maximum likelihood envelope is reduced to serve as a good/bad threshold level.

For each label interval there is a stack element. Each live word path is assigned to the stack element corresponding to the label interval that corresponds to the boundary label of such a live path. A stack element may have zero, one, or more word path entries—the entries being listed in order of likelihood value.

The steps performed by the stack decoder 1002 of FIG. 1 are now discussed.

Figure 6:
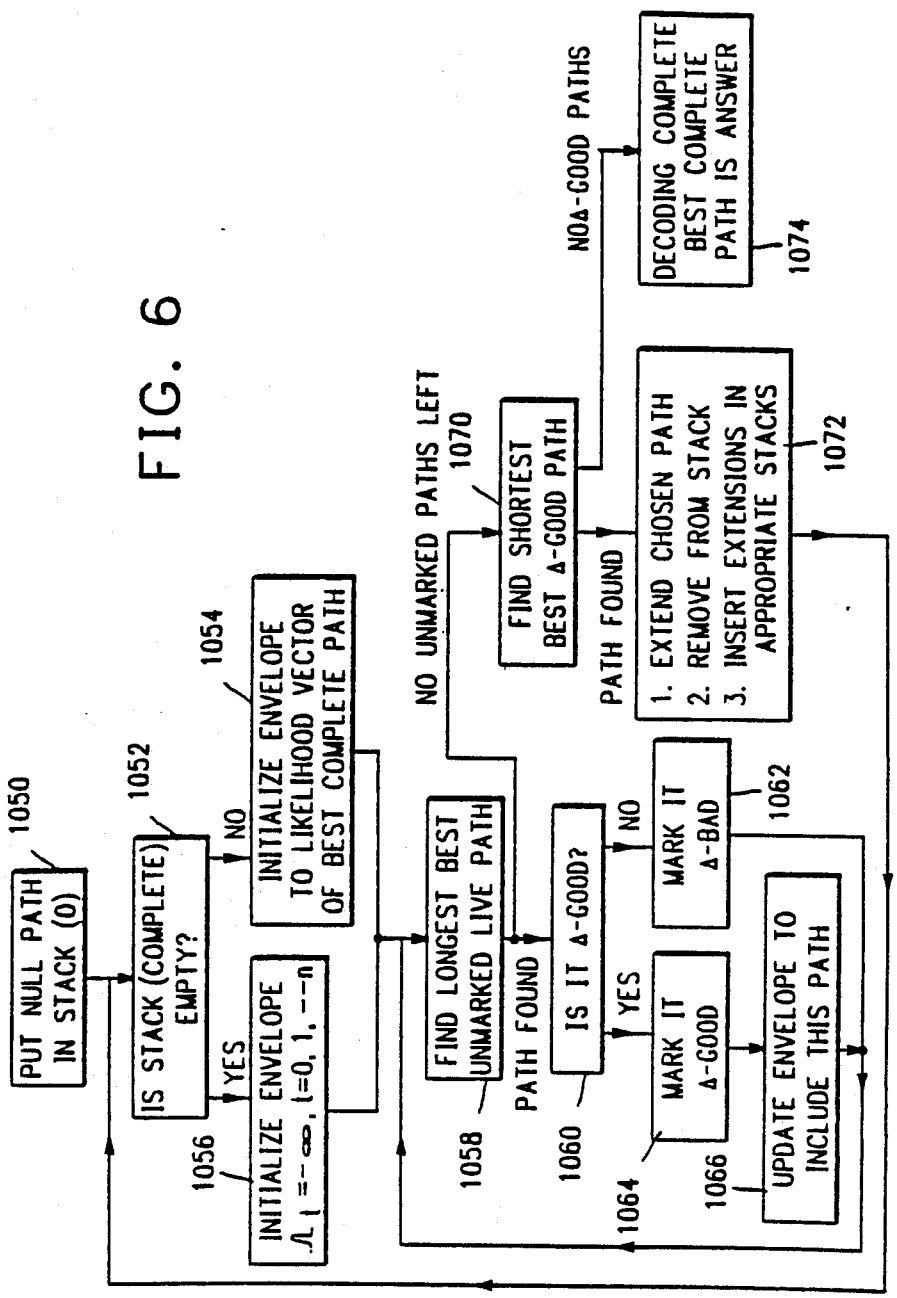
FIG. 6 is a flowchart representing steps in a stack decoding procedure.

Forming the likelihood envelope and determining which word paths are "good" are interrelated as suggested by the sample flowchart of FIG. 6.

In the flowchart of FIG. 6, a null path is first entered into the first stack(0) in step 1050. A stack(complete) element is provided which contains complete paths, if any, which have been previously determined (step 1052). Each complete path in the stack(complete) element has a likelihood vector associated therewith. The likelihood vector of the complete path having the highest likelihood at the boundary label thereof initially defines the maximum likelihood envelope. If there is no complete path in the stack(complete) element, the maximum likelihood envelope is initialized as $-\infty$ at each label interval. Moreover, if complete paths are not specified, the maximum likelihood envelope may be initialized at $-\infty$. Initializing the envelope is depicted by steps 1054 and 1056.

After the maximum likelihood envelope is initialized, it is reduced by a predefined amount Δ to form a Δ-good region above the reduced likelihoods and a Δ-bad region below the reduced likelihoods. The value of Δ controls the breadth of the search. The larger Δ is, the larger the number of word paths that are considered for possible extension. When $\log_{10}$ is used for determining $L_t$, a value of 2.0 for Δ provides satisfactory results. The value of Δ is preferably, but not necessarily, uniform along the length of label intervals.

If a word path has a likelihood at the boundary label thereof which is in the Δ-good region, the word path is marked "good". Otherwise, the word path is marked "bad".

As shown in FIG. 6, a loop for up-dating the likelihood envelope and for marking word paths as "good" (for possible extension) or "bad" starts with the finding of the longest unmarked word path (step 1058). If more than one unmarked word path is in the stack corresponding to the longest word path length, the word path having the highest likelihood at the boundary label thereof is selected. If a word path is found, it is marked as "good" if the likelihood at the boundary label thereof lies within the Δ-good region or "bad" otherwise (step 1060). If the word path is marked, "bad", another unmarked live path is found and marked (step 1062). If the word path is marked "good", the likelihood envelope is up-dated to include the likelihood values of the path marked "good". That is, for each label interval, an up-dated likelihood value is determined as the greater likelihood value between (a) the present likelihood value in the likelihood envelope and (b) the likelihood value associated with word path marked "good". This is illustrated by steps 1064 and 1066. After the envelope is up-dated, a longest best unmarked live word path is again found (step 1058).

The loop is then repeated until no unmarked word paths remain. At that time, the shortest word path marked "good" is selected. If there is more than one word "good" path having a shortest length, the one having the highest likelihood at the boundary label thereof is selected (step 1070). The selected shortest path is then subjected to extension. That is, at least one likely follower word is determined as indicated above by preferably performing the fast match, language model, detailed match, and language model procedure. For each likely follower word, an extended word path is formed. Specifically, an extended word path is formed by appending a likely follower word on the end of the selected shortest word path.

After the selected shortest word path is formed into extended word paths, the selected word path is removed from the stack in which it was an entry and each extended word path is entered into the appropriate stack therefor. In particular, an extended word path becomes an entry into the stack corresponding to the boundary label of the extended word path step (1072).

After the extended paths are formed and the stacks are re-formed, the process repeats by returning to step 1052.

Each iteration thus consists of selecting the shortest best "good" word path and extending it. A word path marked "bad" on one iteration may become "good" on a later iteration. The characterization of a live word path as "good" or "bad" is thus made independently on each iteration. In practice, the likelihood envelope does not change greatly from one iteration to the next and the computation to decide whether a word path is "good" or "bad" is done efficiently. Moreover, normalization is not required.

When complete sentences are identified, step 1074 is preferably included. That is, when no live word paths remain unmarked and there are no "good" word paths to be extended, decoding is finished. The complete word path having the highest likelihood at the respective boundary label thereof is identified as the most likely word sequence for the input label string.

In the case of continuous speech where sentence endings are not identified, path extension proceeds continually or for a predefined number of words as preferred by the system user.

Figure 7:
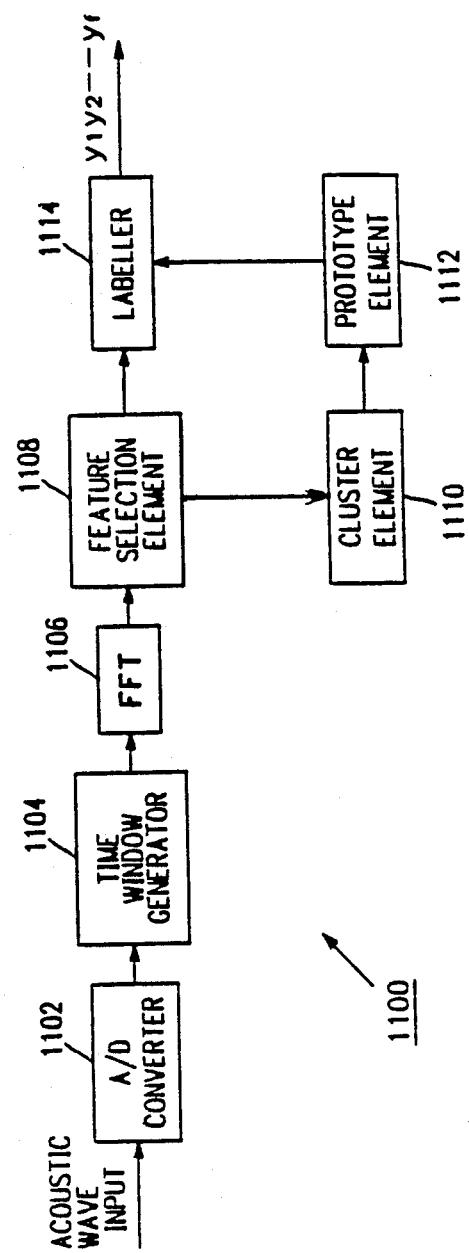
FIG. 7 is an illustration depicting the elements of an acoustic processor.

B. The Auditory Model and Implementation Thereof in an Acoustic Processor of a Speech Recognition System In FIG. 7 a specific embodiment of an acoustic processor 1100, as described above, is illustrated. An acoustic wave input (e.g., natural speech) enters an analog-to-digital converter 1102 which samples at a prescribed rate. A typical sampling rate is one sample every 50 microseconds. To shape the edges of the digital signal, a time window generator 1104 is provided. The output of the window 1104 enters a fast Fourier transform (FFT) element 1106 which provides a frequency spectrum output for each time window.

The output of the FFT element 1106 is then processed to produce labels $L_1 L_2 \cdots L_f$. Four elements—a feature selection element 1108, a cluster element 1110, a prototype element 1112, and a labeller 1114—coact to generate the labels. In generating the labels, prototypes are defined as points (or vectors) in the space based on selected features and acoustic inputs, are then characterized by the same selected features to provide corresponding points (or vectors), in space that can be compared to the prototypes.

Specifically, in defining the prototypes, sets of points are grouped together as respective clusters by cluster element 1110. Methods for defining clusters have been based on probability distributions—such as the Gaussian distribution—applied to speech. The prototype of each cluster—relating to the centroid or other characteristic of the cluster—is generated by the prototype element 1112. The generated prototypes and acoustic input—both characterized by the same selected features—enter the labeller 1114. The labeller 1114 performs a comparing procedure which results in assigning a label to a particular acoustic input.

The selection of appropriate features is a key factor in deriving labels which represent the acoustic (speech) wave input. The presently described acoustic processor includes an improved feature selection element 1108. In accordance with the present acoustic processor, an auditory model is derived and applied in an acoustic processor of a speech recognition system. In explaining the auditory model, reference is made to FIG. 8.

Figure 8:
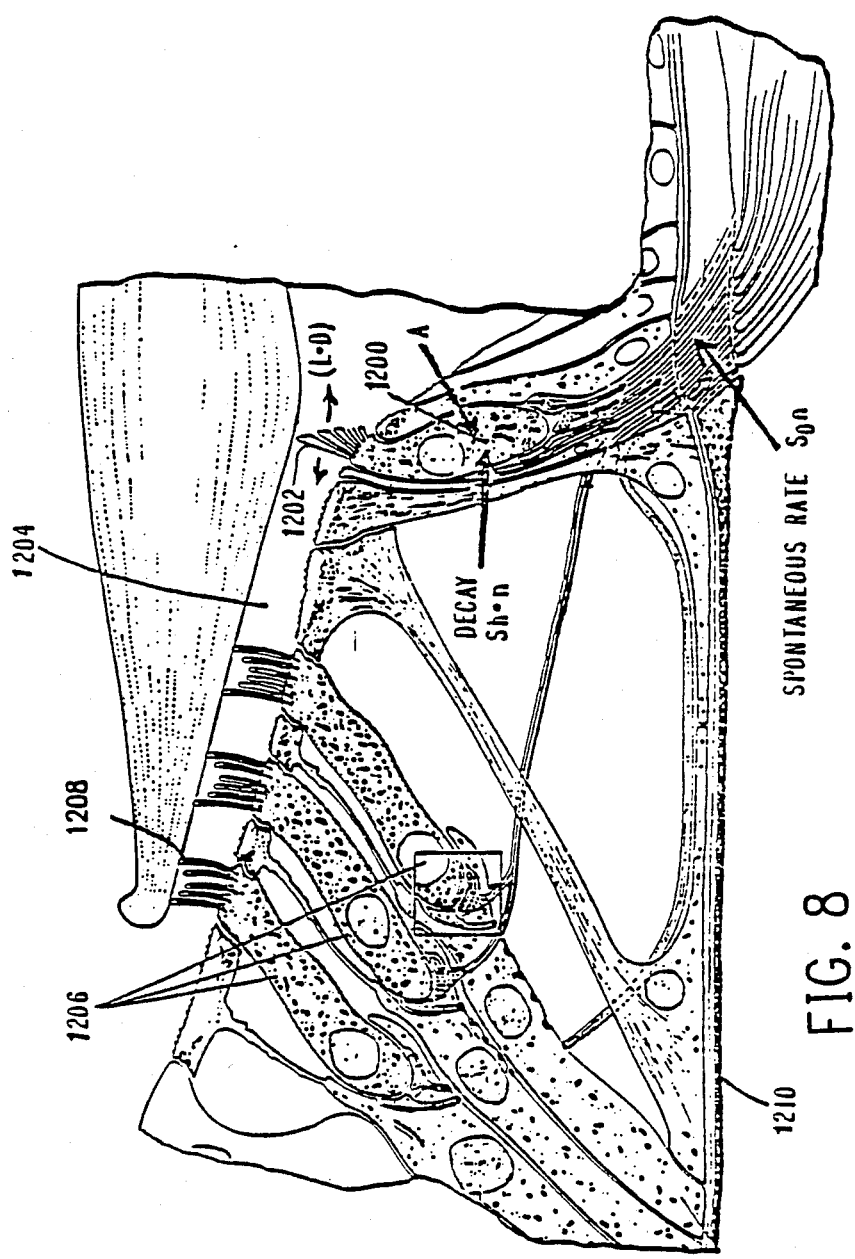
FIG. 8 is an illustration of a typical human ear indicating where components of an acoustic model are defined.

FIG. 8 shows part of the inner human ear. Specifically, an inner hair cell 1200 is shown with end portions 1202 extending therefrom into a fluid-containing channel 1204. Upstream from inner hair cells are outer hair cells 1206 also shown with end portions 1208 extending into the channel 1204. Associated with the inner hair cell 1200 and outer hair cells 1206 are nerves which convey information to the brain. Specifically, nerve neurons undergo electrochemical changes which result in electrical impulses being conveyed along a nerve to the brain for processing. Effectuation of the electrochemical changes, is stimulated by the mechanical motion of the basilar membrane 1210.

It has been recognized, in prior teachings, that the basilar membrane 1210 serves as a frequency analyzer for acoustic waveform inputs and that portions along the basilar membrane 1210 respond to respective critical frequency bands. That different portions of the basilar membrane 1210 respond to corresponding frequency bands has an impact on the loudness perceived for an acoustic waveform input. That is, the loudness of tones is perceived to be greater when two tones are in different critical frequency bands than when two tones of similar power intensity occupy the same frequency band. It has been found that there are on the order of twenty-two critical frequency bands defined by the basilar membrane 1210.

Conforming to the frequency-response of the basilar membrane 1210, the present acoustic processor 1100 in its preferred form physically defines the acoustic waveform input into some or all of the critical frequency bands and then examines the signal component for each defined critical frequency band separately. This function is achieved by appropriately filtering the signal from the FFT element 1106 (see FIG. 5) to provide a separate signal in the feature selection element 1108 for each examined critical frequency band.

The separate inputs, it is noted, have also been blocked into time frames (of preferably 25.6 msec) by the time window generator 1104. Hence, the feature selection element 1108 preferably includes twenty-two signals—each of which represents sound intensity in a given frequency band for one frame in time after another.

Figure 9:
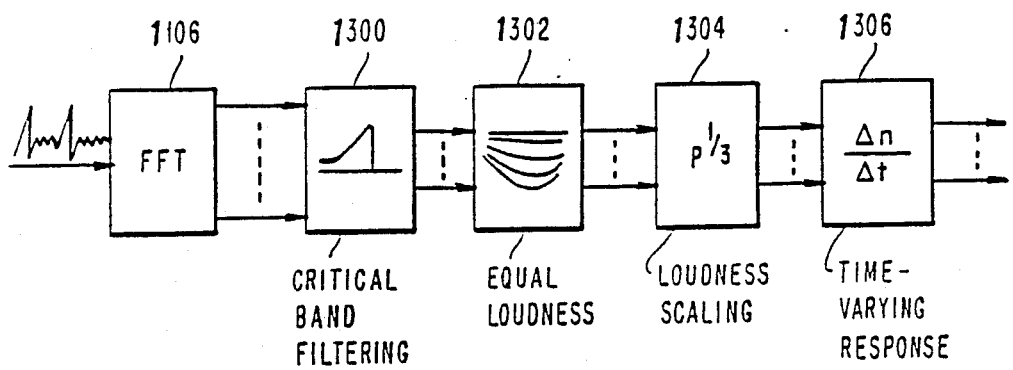
FIG. 9 is a block diagram showing portions of the acoustic processor.

The filtering is preferably performed by a conventional critical band filter 1300 of FIG. 9. The separate signals are then processed by an equal loudness converter 1302 which accounts for perceived loudness variations as a function of frequency. In this regard, it is noted that a first tone at a given dB level at one frequency may differ in perceived loudness from a second tone at the same given dB level at a second frequency. The converter 1302 can be based on empirical data, converting the signals in the various frequency bands so that each is measured by a similar loudness scale. For example, the converter 1302 preferably map from acoustic power to equal loudness based on studies of Fletcher and Munson in 1933, subject to certain modifications. The modified results of these studies are depicted in FIG. 8. In accordance with FIG. 8, a 1 KHz tone at 40 dB is comparable in loudness level to a 100 Hz tone at 60 dB as shown by the X in the figure.

The converter 1302 adjusts loudness preferably in accordance with the contours of FIG. 8 to effect equal loudness regardless of frequency.

In addition to dependence on frequency, power changes and loudness changes do not correspond as one looks at a single frequency in FIG. 8. That is, variations in the sound intensity, or amplitude, are not at all points reflected by similar changes in perceived loudness. For example, at 100 Hz, the perceived change in loudness of a 10 dB change at about 110 dB is much larger than the perceived change in loudness of a 10 dB change at 20 dB. This difference is addressed by a loudness scaling element 1304 which compresses loudness in a predefined fashion. Preferably, the loudness scaling element compresses power P by a cube-root factor to $P^{\frac{1}{3}}$ by replacing loudness amplitude measure in phons by sones.

Figure 10:
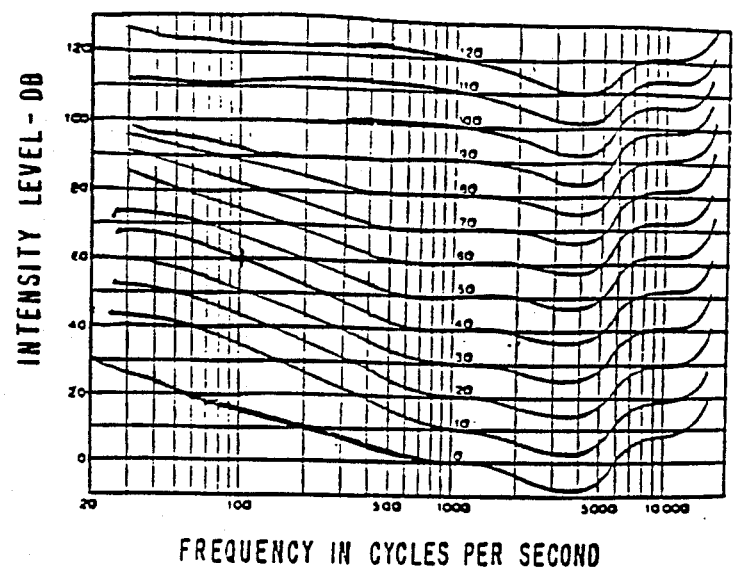
FIG. 10 is a graph showing sound intensity versus frequency, the graph being used in the design of the acoustic processor.
Figure 11:
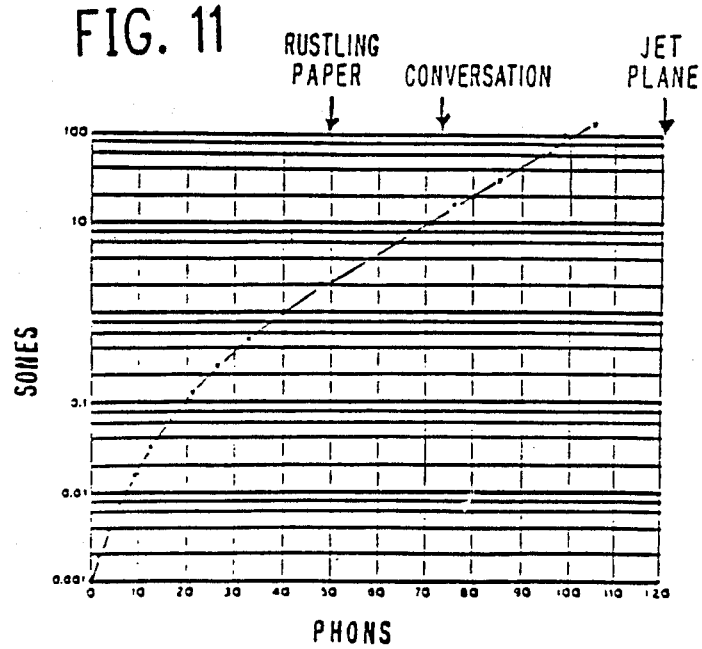
FIG. 11 is a graph showing the relationship between sones and phons.

FIG. 10 illustrates a known representation of phons versus sones determined empirically. By employing sones, the present model remains substantially accurate at large speech signal amplitudes. One sone, it should be recognized, has been defined as the loudness of a 1 KHz tone at 40 dB.

Referring again to FIG. 9, a novel time varying response element 1306 is shown which acts on the equal loudness, loudness scaled signals associated with each critical frequency band. Specifically, for each frequency band examined, a neural firing rate f is determined at each time frame. The firing rate f is defined in accordance with the present processor as:

$$f = (So + DL)n \qquad (1)$$

where n is an amount of neurotransmitter; So is a spontaneous firing constant which relates to neural firings independent of acoustic waveform input; L is a measurement of loudness; and D is a displacement constant. (So)n corresponds to the spontaneous neural firing rate which occurs whether or not there is an acoustic wave input and DLn corresponds to the firing rate due to the acoustic wave input.

Significantly, the value of n is characterized by the present acoustic processor as changing over time according to the relationship:

$$dn/dt = Ao - (So + Sh + DL)n \quad (2)$$

where Ao is a replenishment constant and Sh is a spontaneous neurotransmitter decay constant. The novel relationship set forth in equation (2) takes into account that neurotransmitter is being produced at a certain rate (Ao) and is lost (a) through decay (Sh×n), (b) through spontaneous firing (So×n), and (c) through neural firing due to acoustic wave input (DL×n) The presumed locations of these modelled phenomena are illustrated in FIG. 8.

Equation (2) also reflects the fact that the present acoustic processor is non-linear in that the next amount of neurotransmitter and the next firing rate are dependent multiplicatively on the current conditions of at least the neurotransmitter amount. That is, the amount of neurotransmitter at time $(t + \Delta t)$ is equal to the amount of neurotransmitter at time t plus $dn/dt \Delta t$, or:

$$n(t + \Delta t) = n(t) + dn/dt \Delta t \quad (3)$$

Equations (1), (2), and (3) describe a time varying signal analyzer which, it is suggested, addresses the fact that the auditory system appears to be adaptive over time, causing signals on the auditory nerve to be non-linearly related to acoustic wave input. In this regard, the present acoustic processor provides the first model which embodies non-linear signal processing in a speech recognition system, so as to better conform to apparent time variations in the nervous system.

In order to reduce the number of unknowns in equations (1) and (2), the present acoustic processor uses the following equation (4) which applies to fixed loudness L:

$$So + Sh + DL = 1/T \quad (4)$$

T is a measure of the time it takes for an auditory response to drop to 37% of its maximum after an audio wave input is generated. T, it is noted, is a function of loudness and is, according to the present acoustic processor, derived from existing graphs which display the decay of the response for various loudness levels. That is, when a tone of fixed loudness is generated, it generates a response at a first high level after which the response decays toward a steady condition level with a time constant T. With no acoustic wave input, $T = T_0$ which is on the order of 50 msec. For a loudness of $L_{max}$, $T = T_{max}$ which is on the order of 30 msec. By setting Ao=1, 1/(So+Sh) is determined to be 5 csec, when L=0. When L is $L_{max}$ and $L_{max}=20$ sones, equation (5) results:

$$So + Sn + D(20) = 1/30 \quad (5)$$

With the above data and equations, So and Sh are defined by equations (6) and (7) as:

$$So = DL_{max}/(R + (DL_{max}T_oR) - 1) \quad (6)$$

$$Sh = 1/T_o - So \quad (7)$$

where $$R = \frac{f_{steady\ state}|L = L_{max}}{f_{steady\ state}|L = 0} \quad (8)$$

$f_{steady\ state}|$ represents the firing rate at a given loudness when dn/dt is zero.

R, it is noted, is the only variable left in the acoustic processor. Hence, to alter the performance of the processor, only R is changed. R, that is, is a single parameter which may be adjusted to alter performance which, normally, means minimizing steady state effects relative to transient effects. It is desired to minimize steady state effects because inconsistent output patterns for similar speech inputs generally results from differences in frequency response, speaker differences, background noise, and distortion which affect the steady state portions of the speech signal but not the transient portions. The value of R is preferably set by optimizing the error rate of the complete speech recognition system. A suitable value found in this way is R=1.5. Values of So and Sh are then 0.0888 and 0.11111 respectively, with D being derived as 0.00666.

Figure 12:
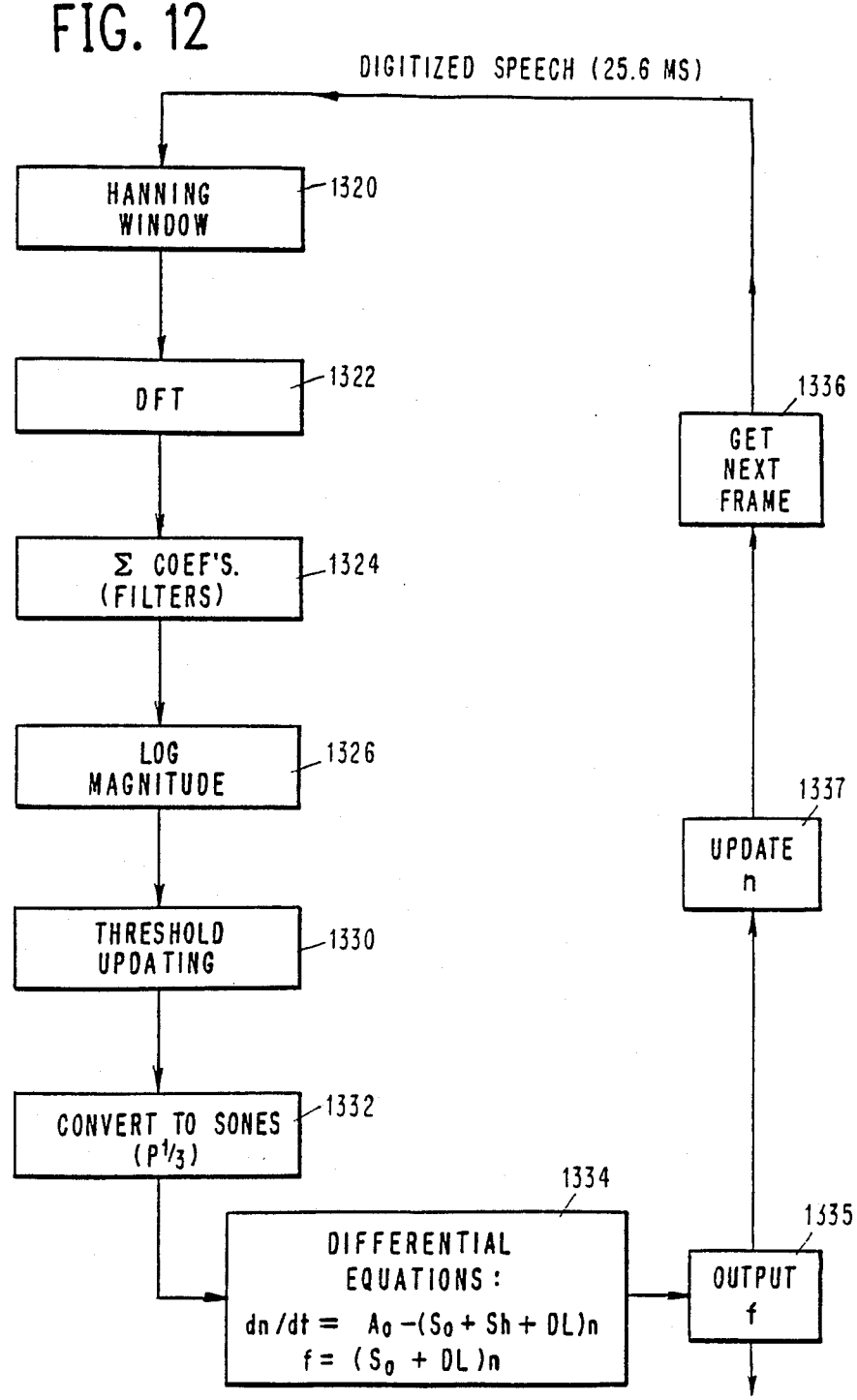
FIG. 12 is a flowchart representation showing how sound is characterized according to the acoustic process of FIG. 7.

Referring to FIG. 12, a flowchart of the present acoustic processor is depicted. Digitized speech in a 25.6 msec time frame, sampled at preferably 20 KHz passes through a Hanning Window 1320 the output from which is subject to a Fourier Transform 1322, taken at preferably 10 msec intervals. The transform output is filtered by element 1324 to provide a power density output for each of at least one frequency band—preferably all the critical frequency bands or at least twenty thereof. The power density is then transformed from log magnitude 1326 to loudness level. This is readily performed according to the modified graph of FIG. 10. The process outlined hereafter which includes threshold up-dating of step 1330 is depicted in FIG. 13.

Figure 13:
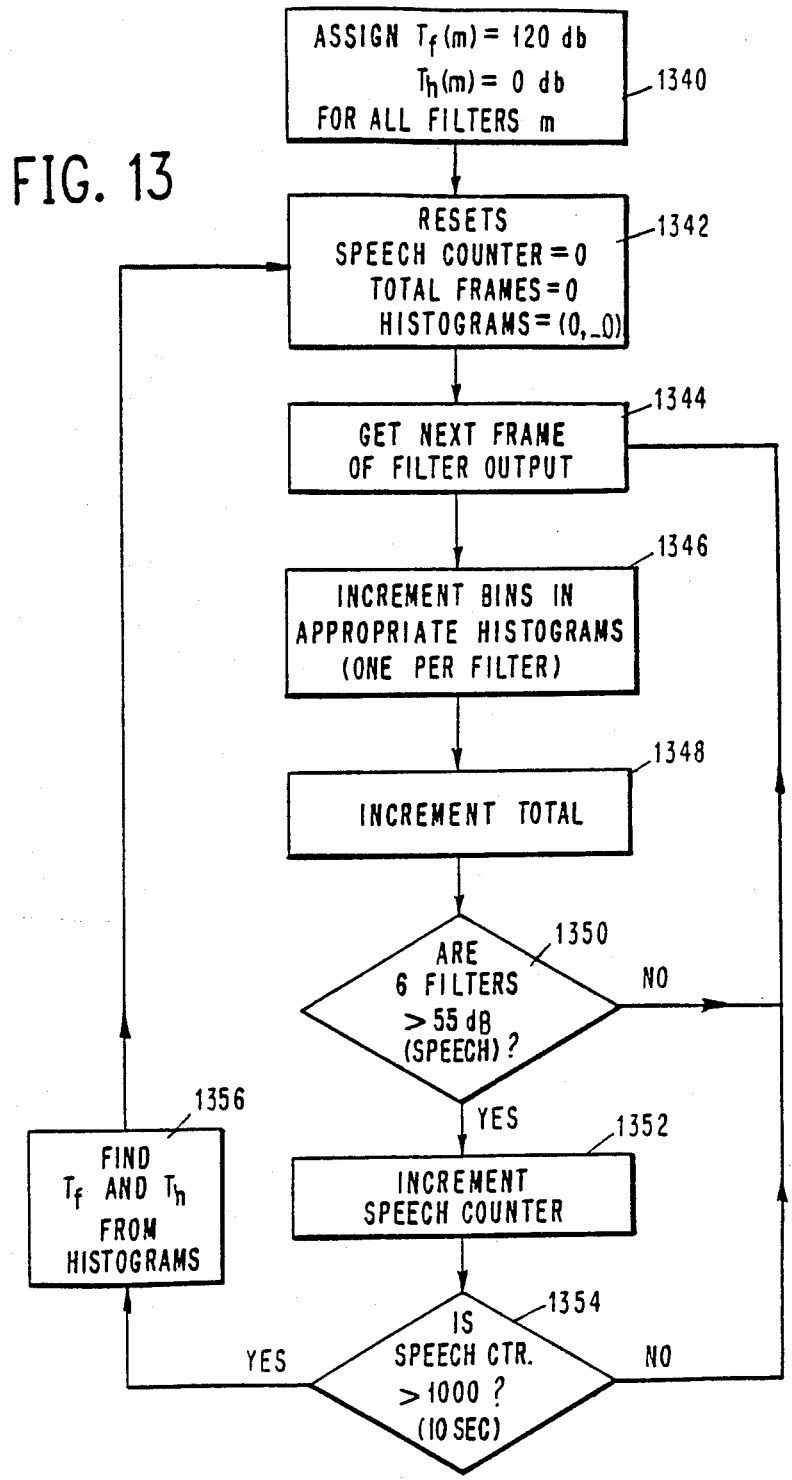
FIG. 13 is a flowchart representation showing how thresholds are up-dated in FIG. 12.

In FIG. 13, a threshold-of-feeling $T_f$ and a threshold-of-hearing $T_h$ are initially defined (at step 1340) for each filtered frequency band m to be 120 dB and 0 dB respectively. Thereafter, a speech counter, total frames register, and a histogram register are reset at step 1342.

Each histogram includes bins, each of which indicates the number of samples or counts during which power or some similar measure—in a given frequency band—is in a respective range. A histogram in the present instance preferably represents—for each given frequency band—the number of centiseconds during which loudness is in each of a plurality of loudness ranges. For example, in the third frequency band, there may be twenty centiseconds between 10 dB and 20 dB in power. Similarly, in the twentieth frequency band, there may be one hundred fifty out of a total of one thousand centiseconds between 50 dB and 60 dB. From the total number of samples (or centiseconds) and the counts contained in the bins, percentiles are derived.

A frame from the filter output of a respective frequency band is examined at step 1344 and bins in the appropriate histograms—one per filter—are incremented at step 1346. The total number of bins in which the amplitude exceeds 55 dB are summed for each filter (i.e. frequency band) at step 1348 and the number of filters indicating the presence of speech is determined. If there is not a minimum of filters (e.g. six of twenty) to suggest speech, the next frame is examined at step 1344. If there are enough filters to indicate speech at step 1350, a speech counter is incremented at step 1352. The speech counter is incremented at step 1352 until 10 seconds of speech have occurred at step 1354 whereupon new values for $T_f$ and $T_h$ are defined for each filter at step 1356.

The new $T_f$ and $T_h$ values are determined for a given filter as follows. For $T_f$, the dB value of the bin holding the 35th sample from the top of 1000 bins (i.e. the 96.5th percentile of speech) is defined as $BIN_H$. $T_f$ is then set as: $T_f = BIN_H + 40$ dB. For $T_h$, the dB value of the bin holding the (0.01) (TOTAL BINS−SPEECH COUNT) th value from the lowest bin is defined as $BIN_L$. That is, $BIN_L$ is the bin in the histogram which is 1% of the number of samples in the histogram excluding the number of samples classified as speech. $T_h$ is then defined as: $T_h = BIN_L - 30$ dB.

Returning to FIG. 12, the sound amplitudes are converted to sones and scaled based on the updated thresholds (steps 1330 and 1332) as described hereinbefore. An alternative method of deriving sones and scaling is by taking the filter amplitudes "a" (after the bins have been incremented) and converting to dB according to the expression:

$$a^{dB} = 20 \log_{10}(a) - 10 \qquad (9)$$

Each filter amplitude is then scaled to a range between 0 and 120 to provide equal loudness according to the expression:

$$a^{eq1} = 120(a^{dB} - T_h)/(T_f - T_h) \qquad (10)$$

$a^{eq1}$ is then preferably converted from a loudness level (phons) to an approximation of loudness in sones (with a 1 KHz signal at 40 dB mapping to 1) by the expression:

$$L^{dB} = (a^{eq1} - 30)/4 \qquad (11)$$

Loudness in sones is then approximated as:

$$L_s(\text{appr}) = 10(L^{dB})/20 \qquad (12)$$

The loudness in sones $L_s$ is then provided as input to the equations (1) and (2) at step 1334 to determine the output firing rate f for each frequency band (step 1335). With twenty-two frequency bands, a twenty-two dimension vector characterizes the acoustic wave inputs over successive time frames. Generally, however, twenty frequency bands are examined by employing a conventional mel-scaled filter bank.

Prior to processing the next time frame (step 1336), the next state of n is determined in accordance with equation (3) in step 1337.

The acoustic processor hereinbefore described is subject to improvement in applications where the firing rate f and neurotransmitter amount n have large DC pedestals. That is, where the dynamic range of the terms of the f and n equations is important, the following equations are derived to reduce the pedestal height.

In the steady state, and in the absence of an acoustic wave input signal (L=0), equation (2) can be solved for a steady-state internal state n':

$$n' = A/(So+Sh) \qquad (13)$$

The internal state of the neurotransmitter amount n(t) can be represented as a steady state portion and a varying equation:

$$n(t) = n' + n''(t) \qquad (14)$$

Combining equations (1) and (14), the following expression for the firing rate results:

$$f(t) = (So + D \times L)(n' + n''(t)) \qquad (15)$$

The term $So \times n'$ is a constant, while all other terms include either the varying part of n or the input signal represented by ($D \times L$). Future processing will involve only the processing will involve only the squared differences between output vectors, so that constant terms may be discharged. Including equation (13) for n', we get $$f'(t) = (So + D \times L) \times ((n''(t) + D \times L \times A)/(So + Sh)) \qquad (16)$$

Considering equation (3), the next state becomes:

$$n(t + \Delta t) = n'(t + \Delta t) + n''(t + \Delta t) \qquad (17)$$

$$= n''(t) + A - (So + Sh + D \times L) \times (n' + n''(t)) \qquad (18)$$

$$= n''(t) - (Sh \times n''(t)) - (So + Ao \times L^A)n''(t) - \qquad (19)$$

$(Ao \times L^A \times D)/(So + Sh) + Ao - ((So \times Ao) +$ $(Sh \times Ao))/(So + Sh)$ This equation (19) may be rewritten, ignoring all constant terms, as:

$$n''(t + \Delta t) = n''(t)(1 - So\Delta t) - f'(t) \qquad (20)$$

Equations (15) and (20) now constitute the output equations and state-update equations applied to each filter during each 10 millisecond time frame. The result of applying these equations is a 20 element vector each 10 milliseconds, each element of the vector corresponding to a firing rate for a respective frequency band in the mel-scaled filter bank.

With respect to the embodiment set forth immediately hereinabove, the flowchart of FIG. 12 applies except that the equations for f, dn/dt, and n(t+1) are replaced by equations (11) and (16) which define special case expressions for firing rate f and next state n (t+$\Delta t$) respectively.

It is to be noted that the values attributed to the terms in the various equations (namely $t_o = 5$ csec, $t_{Lmax} = 3$ csec, Ao=1, R=1.5, and $L_{max}=20$) may be set otherwise and the terms So, Sh, and D may differ from the preferable derived values of 0.0888, 0.11111, and 0.00666, respectively, as other terms are set differently.

The present acoustic model has been practiced using the PL/I programming language with Floating Point Systems FPS 190L hardware, however may be practiced by various other software or hardware approaches.

C. Detailed Match

In FIG. 3, a sample detailed match phone machine 2000 is depicted. Each detailed match phone machine is a probabilistic finite-state machine characterized by (a) a plurality of states $S_i$, (b) a plurality of transitions $tr(S_j|S_i)$, some of the transitions extending between different states and some extending from a state back to itself, each transition having associated therewith a corresponding probability, and (c) for each label that can be generated at a particular transition, a corresponding actual label probability.

In FIG. 3, seven states $S_1$ through $S_7$ are provided and thirteen transitions tr1 through tr13 are provided in the detailed match phone machine 2000. A review of FIG. 3 shows that phone machine 2000 has three transitions with dashed line paths, namely transitions tr11, tr12, and tr13. At each of these three transitions, the phone can change from one state to another without producing a label and such a transition is, accordingly, referred to as a null transition. Along transitions tr1 through tr10 labels can be produced. Specifically, along each transition tr1 through tr10, one or more labels may have a distinct probability of being generated thereat. Preferably, for each transition there is a probability associated with each label that can be generated in the system. That is, if there are two hundred labels that can be selectively generated by the acoustic channel, each transition (that is not a null) has two hundred "actual label probabilities" associated therewith—each of which corresponds to the probability that a corresponding label is generated by the phone at the particular transition. The actual label probabilities for transition tr1 are represented by the symbol p followed by the bracketed column of numerals 1 through 200, each numeral representing a given label. For label 1, there is a probability p[1] t the detailed phone machine 2000 generates label probabilities are stored with relation to the label and a corresponding transition.

When a string of labels $y_1 y_2 y_3$ - - - is presented to a detailed match phone machine 2000 corresponding to a given phone, a match procedure is performed. The procedure associated with the detailed match phone machine is explained with reference to FIG. 14.

Figure 14:
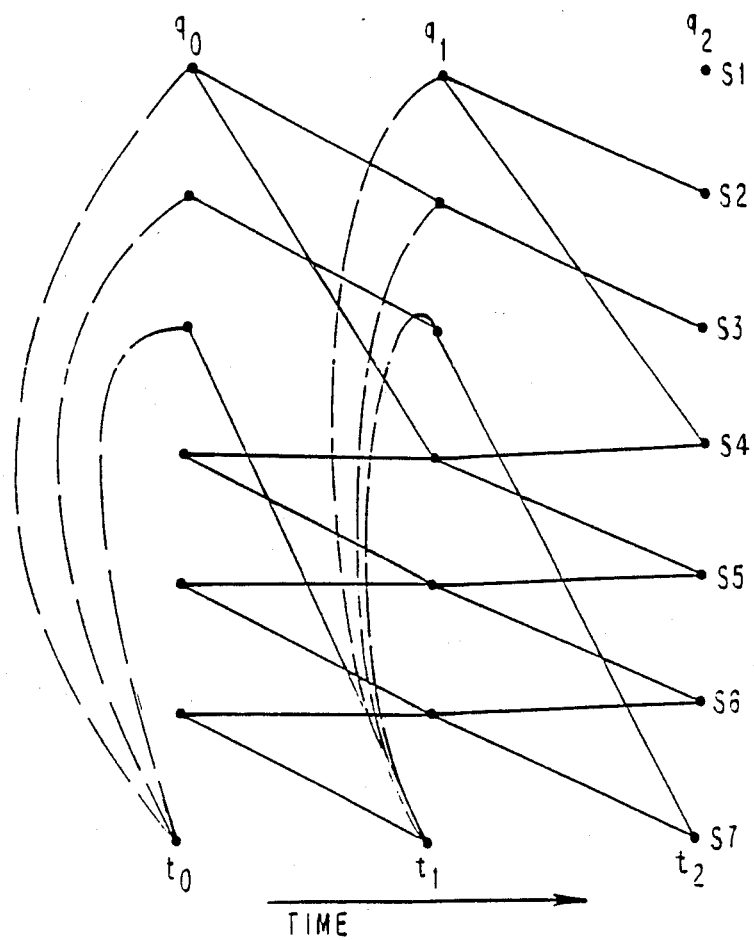
FIG. 14 is a trellis diagram, or lattice, of a detailed match procedure.

FIG. 14 is a trellis diagram of the phone machine of FIG. 3. As in the phone machine, the trellis diagram shows a null transition from state $S_1$ to state $S_7$ and transitions from state $S_1$ to state $S_2$ and from state $S_1$ to state $S_4$. The transition between other states are also illustrated. The trellis diagram also shows time measured in the horizontal direction. Start-time probabilities $q_0$ and $q_1$ represent the probabilities that a phone has a start time at time $t=t_0$ or $t=t_1$, respectively, for the phone. At each start time $t_0$ and $t_1$, the various transitions are shown. It should be noted, in this regard, that the interval between successive start (and end) times is preferably equal in length to the time interval of a label.

In employing the detailed match phone machine 2000 to determine how closely a given phone matches the labels of an incoming string, an end-time distribution for the phone is sought and used in determining a match value for the phone. The notion of relying on the end-time distribution is common to all embodiments of phone machines discussed herein relative to a matching procedure. In generating the end-time distribution to perform a detailed match, the detailed match phone machine 2000 involves computations which are exact and complicated.

Looking at the trellis diagram of FIG. 14, we first consider the computations required to have both a start time and end time at time $t=t_0$. For this to be the case according to the example phone machine structure set forth in FIG. 3, the following probability applies:

$$Pr(S_7, t=t_0) = q_0 \times T(1 \to 7) + Pr(S_2, t=t_0) \times T(2 \to 7) + Pr(S_3, t=t_0) \times T(3 \to 7) \quad (21)$$

where Pr represents "probability of" and T represents the transition probability between the two parenthetically identified states. The above equation indicates the respective probabilities for the three conditions under which the end time can occur at time $t=t_0$. Moreover, it is observed that the end time at $t=t_0$ is limited in the current example to occurrence at state $S_7$.

Looking next at the end time $t=t_1$, it is noted that a calculation relating to every state other than state $S_1$ must be made. The state $S_1$ starts at the end time of the previous phone. For purposes of explanation, only the calculations pertaining to state $S_4$ are set forth.

For state $S_4$, the calculation is:

$$Pr(S_4, t=t_1) = Pr(S_1, t=t_0) \times T(1 \to 4) \times Pr(y_1 | 1 \to 4) + Pr(S_4, t=t_0) \times T(4 \to 4) \times Pr(y_1 | 4 \to 4) \quad (22)$$

In words, the equation (22) set forth immediately above indicates that the probability of the phone machine being in state $S_4$ at time $t=t_1$ is dependent on the sum of the following two terms (a) the probability of being at state $S_1$ at time $t=t_0$ multiplied by the probability (T) of the transition from state $S_1$ to state $S_4$ multiplied further by the probability (Pr) of a given label $y_1$ being generated given a transition from state $S_1$ to state $S_4$ and (b) the probability of being at state $S_4$ at time $t=t_0$ multiplied by the probability of the transition from state $S_4$ to itself and further multiplied by the probability of generating the given label $y_1$ during and given the transition from state $S_4$ to itself.

Similarly, calculations pertaining to the other states (excluding state $S_1$) are also performed to generate corresponding probabilities that the phone is at a particular state at time $t=t_1$. Generally, in determining the probability of being at a subject state at a given time, the detailed match (a) recognizes each previous state that has a transition which leads to the subject state and the respective probability of each such previous state; (b) recognizes, for each such previous state, a value representing the probability of the label that must be generated at the transition between each such previous state and the current state in order to conform to the label string; and (c) combines the probability of each previous state and the respective value representing the label probability to provide a subject state probability over a corresponding transition. The overall probability of being at the subject state is determined from the subject state probabilities over all transitions leading thereto. The calculation for state $S_7$, it is noted, includes terms relating to the three null transitions which permit the phone to start and end at time $t=t_1$ with the phone ending in state $S_7$.

As with the probability determinations relative to times $t=t_0$ and $t=t_1$, probability determinations for a series of other end times are preferably generated to form an end-time distribution. The value of the end-time distribution for a given phone provides an indication of how well the given phone matches the incoming labels.

In determining how well a word matches a string of incoming labels, the phones which represent the word are processed in sequence. Each phone generates an end-time distribution of probability values. A match value for the phone is obtained by summing up the end-time probabilities and then taking the logarithm of that sum. A start-time distribution for the next phone is derived by normalizing the end-time distribution by, for example, scaling each value thereof by dividing each value by the sum so that the sum of scaled values totals one.

It should be realized that there are at least two methods of determining h, the number of phones to be examined for a given word or word string. In a depth first method, computation is made along a baseform—computing a running subtotal with each successive phone. When the subtotal is found to be below a predefined threshold for a given phone position therealong, the computation terminates. Alternatively, in a breadth first method, a computation for similar phone positions in each word is made. The computations following the first phone in each word, the second phone in each word, and so on are made. In the breadth first method, the computations along the same number of phones for the various words are compared at the same relative phone positions therealong. In either method, the word(s) having the largest sum of match values is the sought object.

The detailed match has been implemented in APAL (Array Processor Assembly Language) which is the native assembler for the Floating Point Systems, Inc. 190L.

It should be recognized that the detailed match requires considerable memory for storing each of the actual label probabilities (i.e., the probability that a given phone generates a given label y at a given transition); the transition probabilities for each phone machine; and the probabilities of a given phone being at a given state at a given time after a defined start time. The above-noted FPS 190L is set up to make the various computations of end times, match values based on, for example, a sum—preferably the logarithmic sum of end time probabilities; start times based on the previously generated end time probabilities; and word match scores based on the match values for sequential phones in a word. In addition, the detailed match preferably accounts for "tail probabilities" in the matching procedure. A tail probability measures the likelihood of successive labels without regard to words. In a simple embodiment, a given tail probability corresponds to the likelihood of a label following another label. This likelihood is readily determined from strings of labels generated by, for example, some samples speech.

Hence, the detailed match provides sufficient storage to contain baseform, statistics for the Markov models, and tail probabilities. For a 5000 word vocabulary where each word comprises approximately ten phones, the baseforms have a memory requirement of 5000×10. Where there are 70 distinct phones (with a Markov model for each phone) and 200 distinct labels and ten transitions at which any label has a probability of being produced, the statistics would require 70×10×200 locations. However, it is preferred that the phone machines are divided into three portions—a start portion, a middle portion, and an end portion—with statistics corresponding thereto. (The three self-loops are preferably included in successive portions.) Accordingly, the storage requirements are reduced to 70×3×200. With regard to the tail probabilities, 200×200 storage locations are needed. In this arrangement, 50K integer and 82K floating point storage performs satisfactorily.

It should be noted that the detailed match may be implemented by using fenemic, rather than phonetic, phones. Appendix 1 provides a program listing that corresponds to the main computational kernel of a fenemic detailed match. The routine in Appendix 1 extends a lattice—which corresponds to a fenemic baseform of a current word—forward in time by a single time step. The subroutine EXTLOOP is the main loop. Therebefore, the pipeline is started up and partial computations needed for the main loop are performed. After the main loop, partial computations remaining in the computational pipeline are emptied.

D. Basic First Match

Because the detailed match is computationally expensive, a basic fast match and an alternative fast match which reduces the computation requirements with only moderate sacrifice in accuracy. The fast match is preferably used in conjunction with the the detailed match, the fast match listing likely candidate words from the vocabulary, and the detailed match being performed on, at most, the candidate words on the list.

A fast approximate acoustic matching technique is the subject of the co-pending patent application entitled "Apparatus and Method of Performing Acoustic Matching". In the fast approximate acoustic match, preferably each phone machine is simplified by replacing the actual label probability for each label at all transitions in a given phone machine with a specific replacement value. The specific replacement value is preferably selected so that the match value for a given phone when the replacement values are used in an overestimation of the match value achieved by the detailed match when the replacement values do not replace the actual label probabilities. One way of assuring this condition is by selecting each replacement value so that no probability corresponding to a given label in a given phone machine is greater than the replacement value thereof. By substituting the actual label probabilities in a phone machine with corresponding replacement values, the number of required computations in determining a match score for a word is reduced greatly. Moreover, since the replacement value is preferably an overestimation, the resulting match score is not less than would have previously been determined without the replacement.

In a specific embodiment of performing an acoustic match in a linguistic decoder with Markov models, each phone machine therein is characterized—by training—to have (a) a plurality of states and transition paths between states, (b) transitions $tr(S_j|S_i)$ having probabilities $T(i \rightarrow j)$ each of which represents the probability of a transition to a state $S_j$ given a current state $S_i$ where $S_i$ and $S_j$ may be the same state or different states, and (c) actual label probabilities wherein each actual label probability $p(y_k|i \rightarrow j)$ indicates the probability that a label $y_k$ is produced by a given phone machine at a given transition from one state to a subsequent state where k is a label identifying notation; each phone machine including (a) means for assigning to each $y_k$ in said each phone machine a single specific value $p'(y_k)$ and (b) means for replacing each actual output probability $p(y_k|i \rightarrow j)$ at each transition in a given phone machine by the single specific value $p'(y_k)$ assigned to the corresponding $y_k$. Preferably, the replacement value is at least as great as the maximum actual label probability for the corresponding $y_k$ label at any transition in a particular phone machine. The fast match embodiments are employed to define a list of on the order of ten to one hundred candidate words selected as the most likely words in the vocabulary to correspond to the incoming labels. The candidate words are preferably subjected to the language model and to the detailed match. By paring the number of words considered by the detailed match to on the order of 1% of the words in the vocabulary, the computational cost is greatly reduced while accuracy is maintained.

The basic fast match simplifies the detailed match by replacing with a single value the actual label probabilities for a given label at all transitions at which the given label may be generated in given phone machine. That is, regardless of the transition in a given phone machine whereat a label has a probability of occurring, the probability is replaced by a single specific value. The value is preferably an overestimate, being at least as great as the largest probability of the label occurring at any transition in the given phone machine.

By setting the label probability replacement value as the maximum of the actual label probabilities for the given label in the given phone machine, it is assured that the match value generated with the basic fast match is at least as high as the match value that would result from employing the detailed match. In this way, the basic fast match typically overestimates the match value of each phone so that more words are generally selected as candidate words. Words considered candidates according to the detailed match also pass muster in accordance with the basic fast match.

Figure 15:
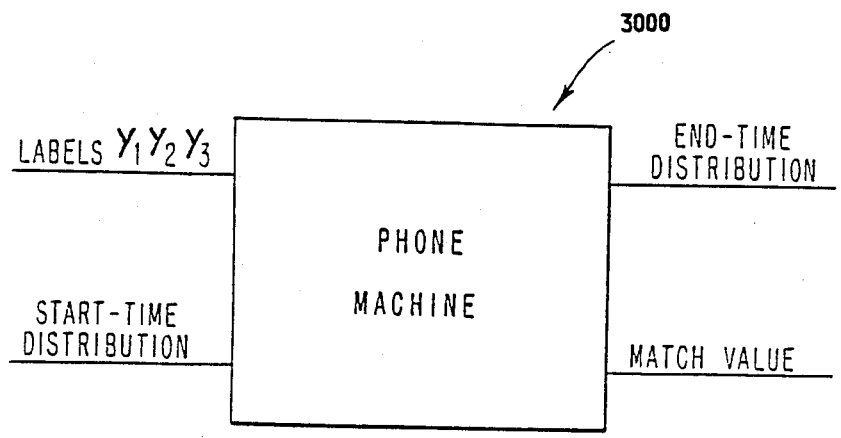
FIG. 15 is a diagram depicting a phone machine used in performing matching.

Referring to FIG. 15, a phone machine 3000 for the basic fast match is illustrated. Labels (also referred to as symbols and fenemes) enter the basic fast match phone machine 3000 together with a start-time distribution. The start-time distribution and the label string input is like that entering the detailed match phone machine described hereinabove. It should be realized that the start time may, on occasion, not be a distribution over a plurality of times but may, instead, represent a precise time—for example following an interval of silence—at which the phone begins. When speech is continuous, however, the end-time distribution is used to define the start-time distribution (as is discussed in greater detail hereinbelow). The phone machine 400 generates an end-time distribution and a match value for the particular phone from the generated end-time distribution. The match score for a word is defined as the sum of match values for component phones—at least the first h phones in the word.

Figure 16:
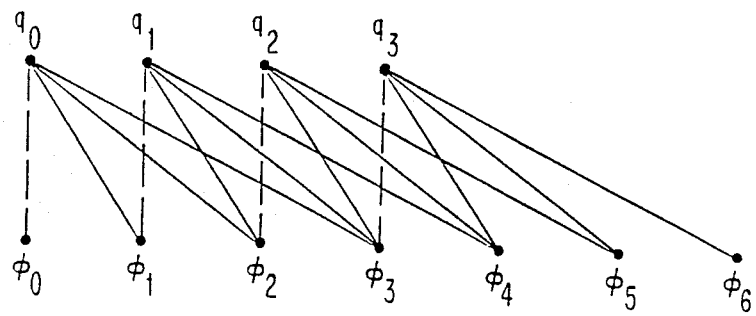
FIG. 16 is a time distribution diagram used in a matching procedure having certain imposed conditions.

Referring now to FIG. 16, a diagram of a basic fast match computation is illustrated. The basic fast match computation is only concerned with the start-time distribution, the number—or length of labels—produced by the phone, and the replacement values $p'_{yk}$ associated with each label $y_k$. By substituting all actual label probabilities for a given label in a given phone machine by a corresponding replacement value, the basic fast match replaces transition probabilities with length distribution probabilities and obviates the need for including actual label probabilities (which can differ for each transition in a given phone machine) and probabilities of being at a given state at a given time.

In this regard, the length distributions are determined from the detailed match model. Specifically, for each length in the length distribution, the procedure preferably examines each state individually and determines for each state the various transition paths by which the currently examined state can occur (a) given a particular label length and (b) regardless of the outputs along the transitions. The probabilities for all transition paths of the particular length to each subject state are summed and the sums for all the subject states are then added to indicate the probability of a given length in the distribution. The above procedure is repeated for each length. In accordance with the preferred form of the matching procedure, these computations are made with reference to a trellis diagram as is known in the art of Markov modelling. For transition paths which share branches along the trellis structure, the computation for each common branch need be made only once and is applied to each path that includes the common branch.

In the diagram of FIG. 16, two limitations are included by way of example. First, it is assumed that the length of labels produced by the phone can be zero, one, two, or three having respective probabilities of $l_0$, $l_1$, $l_2$, and $l_3$. The start time is also limited, permitting only four start times having respective probabilities of $q_0$, $q_1$, $q_2$, and $q_3$. With these limitations, the following equations define the end-time distribution of a subject phone as:

$\Phi_0 = q_0 l_0$ $\Phi_1 = q_1 l_0 + q_0 l_1 p_1$ $\Phi_2 = q_2 l_0 + q_1 l_1 p_2 + q_0 l_2 p_1 p_2$ $\Phi_3 = q_3 l_0 + q_2 l_1 p_3 + q_1 l_2 p_2 p_3 + q_0 l_3 p_1 p_2 p_3$ $\Phi_4 = q_3 l_1 p_4 + q_2 l_2 p_3 p_4 + q_1 l_3 p_2 p_3 p_4$ $\Phi_5 = q_3 l_2 p_4 p_5 + q_2 l_3 p_3 p_4 p_5$ $\Phi_6 q_3 l_3 p_4 p_5 p_6$

In examining the equations, it is observed that $\Phi_3$ includes a term corresponding to each of four start times. The first term represents the probability that the phone starts at time $t=t_3$ and produces a length of zero labels —the phone starting and ending at the same time. The second term represents the probability that the phone starts at time $t=t_2$, that the length of labels is one, and that a label 3 is produced by the phone. The third term represents the probability that the phone starts at time $t=t_1$, that the length of labels is two (namely labels 2 and 3), and that labels 2 and 3 are produced by the phone. Similarly, the fourth term represents the probability that the phone starts at time $t=t_0$; that the length of labels is three; and that the three labels 1, 2, and 3 are produced by the phone.

Comparing the computations required in the basic fast match with those required by the detailed match suggest the relative simplicity of the former relative to the latter. In this regard, it is noted that the $p'_{yk}$ value remains the same for each appearance in all th equations as do the label length probabilities. Moreover, with the length and start time limitations, the computations for the later end times become simpler. For example, at $\Phi_6$, the phone must start at time $t=t_3$ and all three labels 4, 5, and 6 must be produced by the phone for that end time to apply.

In generating a match value for a subject phone, the end time probabilities along the defined end-time distribution are summed. If desired, the log of the sum is taken to provide the expression:

match value = $\log_{10}(\Phi_0 + \cdots + \Phi_6)$

As noted previously, a match score for a word is readily determined by summing the match values for successive phones in a particular word.

Figure 17:
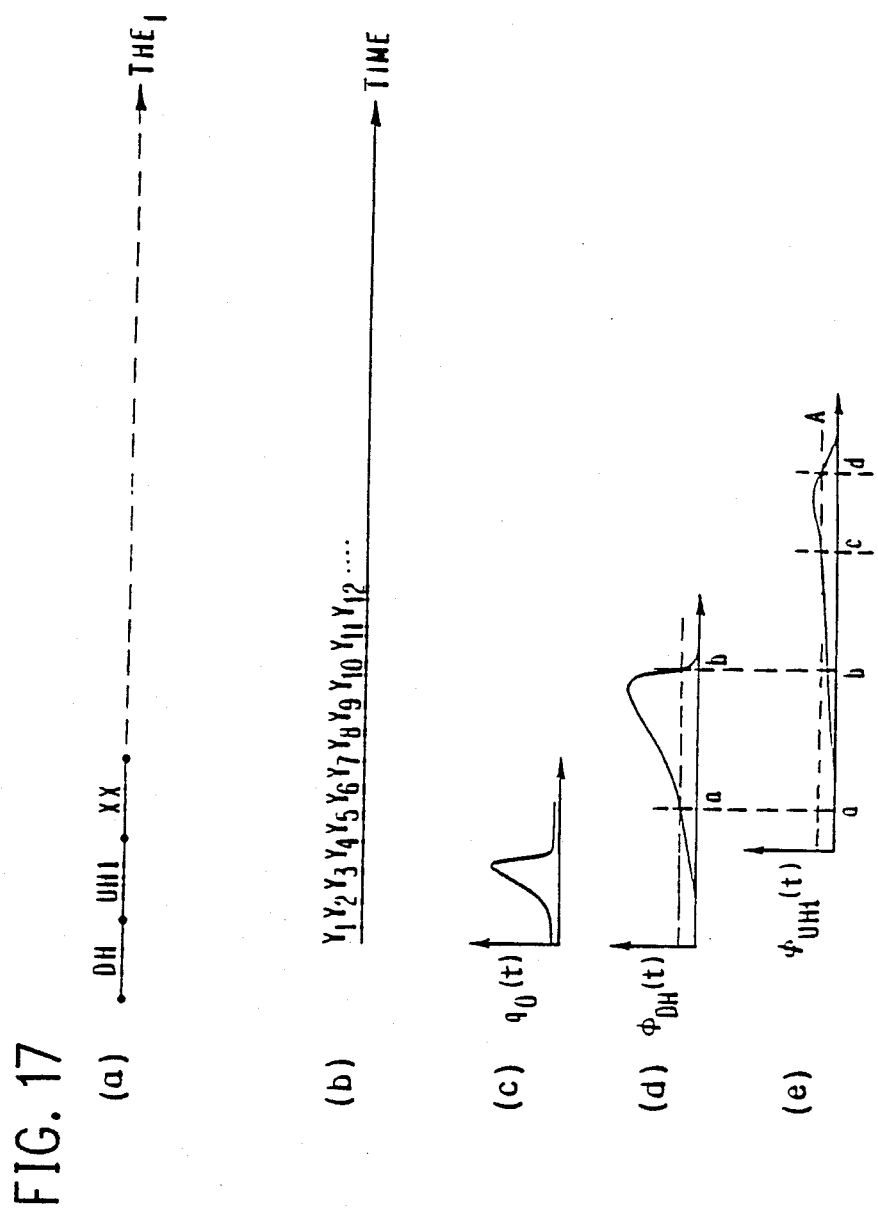
FIGS. 17 (a) through (e) are diagrams which show the interrelationship between phones, a label string, and start and end times determined in the matching procedure.

In describing the generating of the start time distribution, reference is made to FIGS. 17. In FIG. 17(a), the word $THE_1$ is repeated, broken down into its component phones. In FIG. 17(b), the string of labels is depicted over time. In FIG. 17(c), a first start-time distribution is shown. The first start-time distribution has been derived from the end-time distribution of the most recent previous phone (in the previous word which may include a "word" of silence). Based on the label inputs and the start-time distribution of FIG. 17(c), the end-time distribution for the phone DH, $\Phi_{DH}$, is generated. The start-time distribution for the next phone, UH, is determined by recognizing the time during which the previous phone end-time distribution exceeded a threshold old (A) in FIG. 17(d). (A) is determined individually for each end-time distribution. Preferably, (A) is a function of the sum of the end-time distribution values for a subject phone. The interval between times a and b thus represents the time during which the start-time distribution for the phone UH is set. (See FIG. 17(e).) The interval between times c and d in FIG. 17(e) corresponds to the times between which the end-time distribution for the phone DH exceeds the threshold (A) and between which the start-time distribution of the next phone is set. The values of the start-time distribution are obtained by normalizing the end-time distribution by, for example, dividing each end-time value by the sum of the end-time values which exceed the threshold (A).

The basic fast match phone machine 3000 has been implemented in a Floating Point Systems Inc. 190L with an APAL program. Other hardware and software may also be used to develop a specific form of the matching procedure by following the teachings set forth herein.

E. Alternative Fast Match

The basic fast match employed alone or, preferably, in conjunction with the detailed match and/or a language model greatly reduces computation requirements. To further reduce computational requirements, the present teachings further simplifies the detailed match by defining a uniform label length distribution between two lengths—a minimum length $L_{min}$ and a maximum length $L_{max}$. In the basic fast match, the probabilities of a phone generating labels of a given length—namely $l_0$, $l_1$, $l_2$, etc.—typically have differing values. According to the alternative fast match, the probability for each length of labels is replaced by a single uniform value.

Preferably, the minimum length is equal to the smallest length having a nonzero probability in the original length distribution, although other lengths may be selected if desired. The selection of the maximum length is more arbitrary than the selection of the minimum length, but is significant in that the probability of lengths less than the minimum and greater than the maximum are set as zero. By defining the length probability to exist between only the minimum length and the maximum length, a uniform pseudo-distribution can be set forth. In one approach, the uniform probability can be set as the average probability over the pseudo-distribution. Alternatively, the uniform probability can be set as the maximum of the length probabilities that are replaced by the uniform value.

The effect of characterizing all the label length probabilities as equal is readily observed with reference to the equations set forth above for the end-time distribution in the basic fast match. Specifically, the length probabilities can be factored out as a constant.

With $L_{min}$ being set at zero and all length probabilities being replaced by a single constant value, the end-time distribution can be charcterized as:

$$\theta_m = \Phi_m/1 = q_m + \theta_{m-1}p_m$$

where "1" is the single uniform replacement value and where the value for $p_m$ corresponds preferably to the replacement value for a given label being generated in the given phone at time m.

For the above equation for $\theta_m$, the match value is defined as:

$$\text{match value} = \log_{10}(\theta_0 + \theta_1 + \cdots + \theta_m) + \log_{10}(l)$$

In comparing the basic fast match and the alternative fast match, it has been found that the number of required additions and multiplications are greatly reduced by employing the alternative fast match phone machines. With $L_{min}=0$, it has been found that the basic fast match requires forty multiplications and twenty additions in that the length probabilities must be considered. With the alternative fast match, $\theta_m$ is determined recursively and requires one multiplication and one addition for each successive $\theta_m$.

To further illustrate how the alternative fast match simplifies computations, FIGS. 18 and FIGS. 19 are provided. In FIG. 18(a), a phone machine embodiment 3100 corresponding to a minimum length $L_{min}$'0 is depicted. The maximum length is assumed to be infinite so that the length distribution may be characterized as uniform. In FIG. 18(b), the trellis diagram resulting from the phone machine 3100 is shown. Assuming that start times after $q_n$ are outside the start-time distribution, all determinations of each successive $\theta_m$ with m<n require one addition and one multiplication. For determinations of end times thereafter, there is only one required multiplicaton and no additions.

In FIGS. 19, $L_{min}=4$. FIG. 19(a) illustrates a specific embodiment of a phone machine 3200 therefor and FIG. 19(b) shows a corresponding trellis diagram. Because $L_{min}=4$, the trellis diagram of FIG. 19(b) has a zero probability along the paths marked u, v, w, and z. For those end times which extend between $\theta_4$ and $\theta_n$, it is noted that four multiplications and one addition is required. For end times greater than n+4, one multiplication and no additions are required. This embodiment has been implemented in APAL code o a FPS 190L.

In Appendix 2, a program listing corresponding to the main computational kernel of the fast (approximate) match is provided. The code corresponds to the case where $L_{min}=4$.

It should be noted that additional states may be added to the FIGS. 18 or FIGS. 19 embodiments as desired.

F. Matching Based on First J Labels

As a further refinement to the basic fast match and alternative fast match, it is contemplated that only the first J labels of a string which enters a phone machine be considered in the match. Assuming that labels are produced by the acoustic processor of an acoustic channel at the rate of one per centisecond, a reasonable value for J is one hundred. In other words, labels corresponding to on the order of one second of speech will be provided to determine a match between a phone and the labels entering the phone machine. By limiting the number of labels examined, two advantages are realized. First, decoding delay is reduced and, second, problems in comparing the scores of short words with long words are substatially avoided. The length of J can, of course, be varied as desired.

The effect of limiting the number of labels examined can be noted with reference to the trellis diagram of FIG. 19(b). Without the present refinement, the fast match score is the sum of the probabilities of $\theta_m$'s along the bottom row of the diagram. That is, the probability of being at state $S_4$ at each time starting at $t=t_0$ (for $L_{min}=0$) or $t=t_4$ (for $L_{min}=4$) is determined as a $\theta_m$ and all $\theta_m$'s are then totalled. For $L_{min}=4$, there is no probability of being in state $S_4$ at any time before $t_4$. With the refinement, the summing of $\theta_m$'s terminates at time J. In FIG. 19(b), time J corresponds to time $t_{n+2}$.

Terminating the examination of J labels over J time intervals can result in the following two probability summations in determining a match score. First, as described hereinabove, there is a row calculation along the bottom row of the rellis diagram but only up to the time J−1. The probabilities of being in state $S_4$ at each time up to time J−1 are summed to form a row score. Second, there is a column score which corresponds to the sum of probabilities that the phone is at each respective state $S_0$ through $S_4$ at time J. That is, the column score is:

column score = $\Sigma_{f=0}^{4} Pr(S_f, J)$

The match score for a phone is obtained by summing the row score and column score and then taking the logarithm of that sum. To continue the fast match for the next phone, the values along the bottom row—preferably including time J—are used to derive the next phone start-time distribution.

After determining a match score for each of b consecutive phones, the total for all phones is, as before noted, the sum of the match scores for all the phones.

In examining the manner in which the end-time probabilities are generated in the basic fast match and alternative fast match embodiments set forth above, it is noted that the determination of column scores does not conform readily to the fast match computations. To better adapt the refinement of limiting the number of labels examined to the fast match and alternative match, the present matching technique provides that the column score be replaced by an additional row score. That is, an additional row score is determined for the phone being at state $S_4$ (in FIG. 19(b)) between times J and J+K where K is the maximum number of states in any phone machine. Hence, if any phone machine has ten states, the present refinement adds ten end times along the bottom row of the trellis for each of which a probability is determined. All the probabilities along the bottom row up to and including he probability at time J+K are added to produce a match score for the given phone. As before, consecutive phone match values are summed to provide a word match score.

This embodiment has been implemented in APAL code on a FPS 190L; however as with other portions of the system may be implemented with other codes on other hardware.

G. Phone Tree Structure and Fast Match Embodiments

By employing the basic fast match or alernative fast match—with or without the maximum label limitation—the computational time required in determining phone match values is tremendously reduced. In addition, the computational savings remain high even when the detailed match is performed on the words in the fast match derived list.

Figure 20:
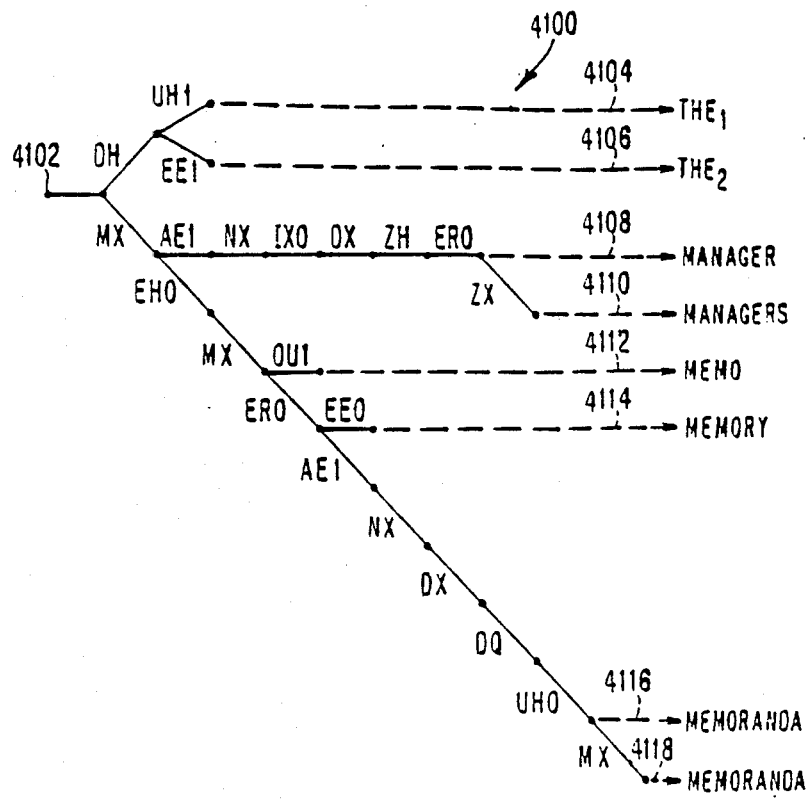
FIG. 20 is a diagram illustrating a tree structure of phones which permit processing of multiple words simultaneously.

The phone match values, once determined, are compared along the branches of a tree structure 4100 as shown in FIG. 20 to determine which paths of phones are most probable. In FIG. 20, the phone match values for DH and UH1 (emanating from point 4102 to branch 4104) should sum to a much higher value for the spoken word "the"0 than the various sequences of phones branching from the phone MX. In this regard, it should be observed that the phone match value of the first MX phone is computed only once and is then used for each baseform extending therefrom. (See branches 4104 and 4106.) In addition, when the total score calculated along a first sequence of branches is found to be much lower than a threshold value or much lower than the total score for other sequences of branches, all baseforms extending from the first sequence may be simultaneously eliminated as candidate words. For example, baseforms associated with branches 4108 through 4118 are simultaneously discarded when it is determined that MX is not a likely path.

With the fast match embodiments and the tree structure, an ordered list of candidate words is generated with great computational savings.

With regard to storage requirements, it is noted that the tree structue of phones, the statistics for the phones, and tail probabilities are to be stored. With regard to the tree structure, there are 25000 arcs and four datawords characterizing each arc. The first dataword represents an index to successor arcs or phones. The second dataword indicates the number of successor phones along the branch. The third dataword indicates at which node in the tree the arc is located. And the fourth dataword indicates the current phone. Hence, for the tree structure, 25000'4 storage spaces are required. In the fast match, there are 100 distinct phones and 200 distinct fenemes. In that a feneme has a single probability of being produced anywhere in a phone, storage for 100×200 statistical probabilities is required. Finally, for the tail probabilities, 200×200 storage spaces are required. 100K integer and 60K floating point storage is sufficient for the fast match.

H. Language Model

As noted previously, a language model which stores information —such as tri-grams— relating to words in context may be included to enhance the probability of a correct word selection. Language models have been reported in the literature.

The language model 1010, preferably, has a unique character. Specifically, a modified tri-gram method is used. In accordance with this method, a sample text is examined to determine the likelihood of each ordered triplet of words, ordered pair of words, or single words in the vocabulary. A list of the most likely triplets of words and a list of the most likely pairs of words are formed. Moreover, the likelihood of a triplet not being in the triplet list and the likelihood of a pair not being in the pair list are respectively.

In accordance with the language model, when a subject word follows two words, a determination is made as to whether the subject word and the two preceding words are on the triplet list. If so, the stored probability assigned to the triplet is indicated. If the subject word and its two predecessors are not on the triplet list, a determination is made as to whether the subject word and its adjacent predecessor are on the pair list. If so, the probability of the pair is multiplied by the probability of a triplet not being on the triplet list, the product then being assigned to the subject word. If the subject word and its predecessor(s) are not on the triplet list or pair list, the probability of the subject word alone is multiplied by the likelihood of a triplet not being on the triplet list and by the probability of a pair not being on the pair list. The product is then assigned to the subject word.

Figure 21:
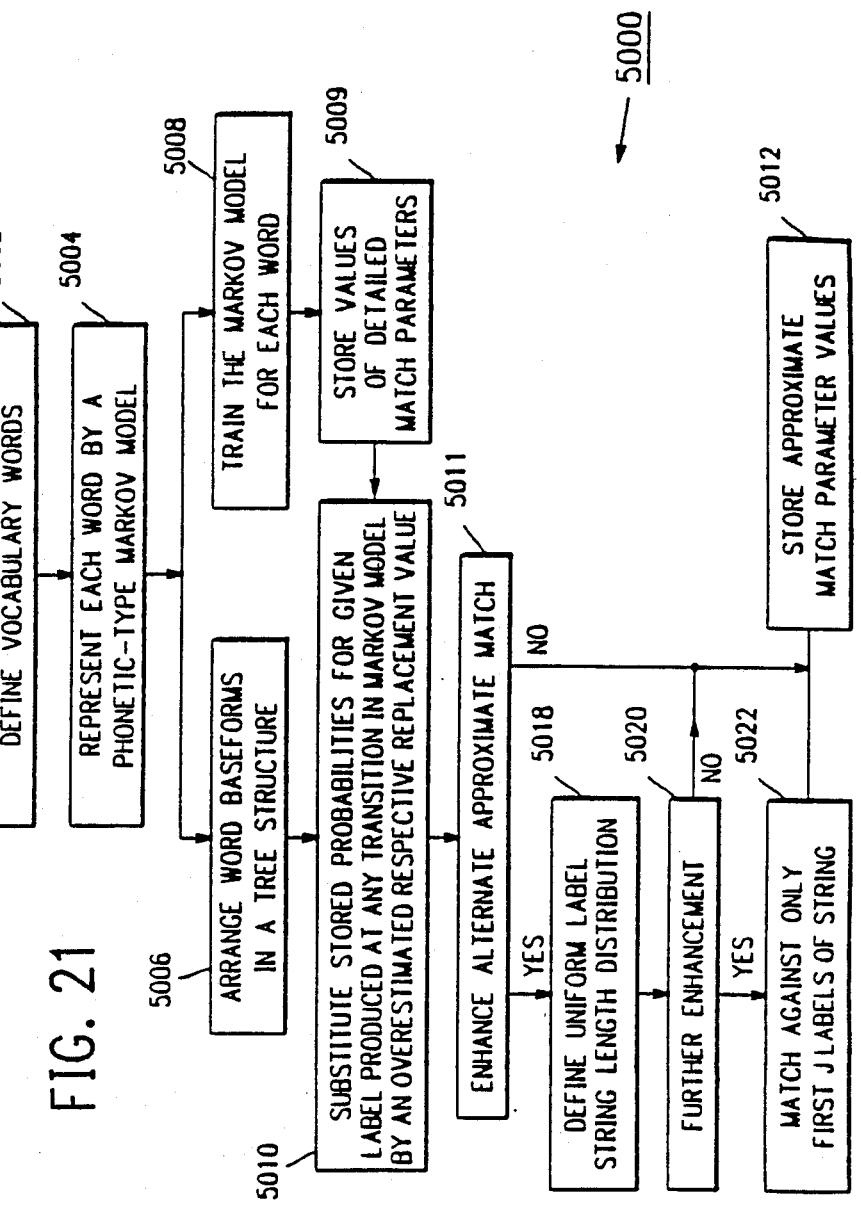
FIG. 21 is a flowchart outlining the steps performed in forming trained word baseforms.

Referring to FIG. 21, a flowchart 5000 for the selection of a word from a vocabulary by using the fast match, detailed match, and language model is set forth. In step 5002, words in a vocabulary are defined and, in step 5004, each word is represented by a Markov model phonetic baseform. The phones of the baseforms are arranged in a tree structure (as shown in FIG. 20) in step 5006. The Markov models for the various words are trained in step 5008 from the reading of sample text as suggested in the co-pending application "Determination of Phone Weights for Markov Models in a Speech Recognition System" (discussed hereinbelow). Probabilities associated with each Markov model word baseform (e.g. transition probabilities and label probabilities at the various transitions) are retained for the detailed match step (to be performed later). The probabilities for a given label in a given Markov model phone machine are substituted by a preferably overestimated replacement value in step 5010 so that a basic fast match can be performed in step 5012. The string of labels from an acoustic processor (discussed hereinabove) provide input in step 5014 to the approximate match step 5012. If the basic fast match is to be enhanced at step 5016, a uniform length distribution approximation is applied in step 5018. If further enhancement is to be provided at step 5020, matching is limited to the first J labels at step 5022. After the desired approximate fast match, a list of candidate words in order of probability is provided to the language model in step 5024. A detailed match is then performed at step 5026 on the more likely words in the vocabulary as determined by the approximate match and the language model. The words from the detailed match step of 5026 is subjected to the language model in step 5028 so that a most likely word can be selected at step 5030.

(II) Constructing Phonetic and Fenemic Markov Model Baseforms for Words

A. Constructing Phonetic Baseforms

One type of Markov model phone machine which can be used in forming baseforms is based on phonetics. That is, each phone machine corresponds to a given phonetic sound.

For a given word, there is a sequence of phonetic sounds each having a respective phone machine corresponding thereto. Each phone machine includes a number of states and transitions therebetween, some of which can produce a feneme output and some (referred to as null transitions) which cannot. Statistics relating to each phone machine —as noted hereinabove— include (a) the probability of a given transition occurring and (b) the probability of a particular feneme being produced at a given transition. Preferably, at each non-null transition there is some probability associated with each feneme. In a feneme alphabet shown in Table 1, there are about 200 fenemes. A phone machine used in forming phonetic baseforms is illustrated in FIG. 3. A sequence of such phone machines is provided for each word. The statistics, or probabilities, are entered into the phone machines during a training phase in which known words are uttered. Transition probabilities and feneme probabilities in the various phonetic phone machines are determined during training by noting the feneme string(s) generated when a known phonetic sound is uttered at least once and by applying the well-known forward-backward algorithm.

A sample of statistics for one phoen identified as phone DH are set forth in Table 2. As an approximation, the label output probability distribution for transitions tr1, tr2, and tr8 of the phone machine of FIG. 3 are represented by a single distribution; transistions tr3, tr4, tr5, and tr9 are represented by a single distribution; and transitions tr6, tr7, and tr10 are represented by a single distribution. This is shown in Table 2 by the assignment of arcs (i.e. transitions) to the respective columns 4, 5, or 6. Table 2 shows the probability of each transition and the probability of a label (i.e. feneme) being generated in the beginning, middle, or end, respectively, of the phone DH. For the DH phone, for example, the probability of the transition from state $S_1$ to state $S_2$ is counted as 0.07243. The probability of transition from state $S_1$ to state $S_4$ is 0.92757. (In that these are the only two possible transitions from the initial state, their sum equals unity.) As to label output probabilities, the DH phone has a 0.091 probability of producing the feneme AE13 (see Table 1) at the end portion of the phone, i.e. column 6 of Table 2. Also in Table 2 there is a count associated with each node (or state). The node cont is indicative of the number of times during the training that the phone was in the corresponding state. Statistics as in Table 2 are found for each phoneme machine.

The arranging of phonetic phone machines into a word baseform sequence is typically performed by a phonetician and is normally not not done automatically.

The phonetic baseform has been used in the detailed match and in the fast approximate acoustic match with some success. Because the phonetic baseform relies on the judgment of a phonetician and is not automatic, phonetic baseforms are sometimes inaccurate.

B. Constructing A Fenemic Baseform

Figure 22:
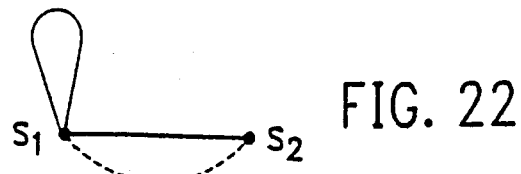
FIG. 22 is an illustration showing a fenemic phone machine.
Figure 23:
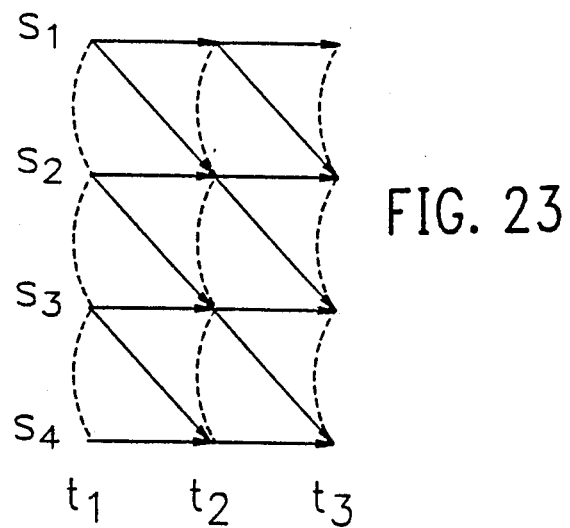
FIG. 23 is a trellis diagram for a sequential plurality of fenemic phone machines.

An alternative to the phonetic baseform is the fenemic baseform. Instead of each phone machine in the baseform corresponding to a phonetic sound, each phone machine corresponds to a respecive feneme in the fenemic alphabet. A simple fenemic phone machine includes two states $S_1$ and $S_2$ and a plurality of transitions, each having a respective probability (see FIG. 22). One transition is a null trnsition between the two states whereat no feneme can be produced. A first non-null transition between the two states has a respective probability for each feneme being produced thereat. A second non-null transition corresponds to a self-loop at state $S_1$, each feneme having a probability of being produced thereat. It can thus be seen that the simple fenemic phone machine can produce zero, one, or more fenemes. A trellis diagram based on fenemic phoes is shown in FIG. 23.

In constructing feneme-based Markov model phone machines, it is preferred that the phone machines be based on multiple utterances. By basing the phone machines on multiple utterances, the phone machines can account for variations in pronunciation of a given word. One method for achieving this end is set forth in a co-pending patent application entitled "Constructing Feneme-based Markov Models of Words from Multiple Utterances" by L. R. Bahl, R. L. Mercer, M. A. Picheny, and P. V. deSouza.

In constructing baseforms of words according to the teachings of the application noted immediately hereinabove, the steps listed below are followed in constructing the fenemic baseform for each word segment (e.g. each word or predefined syllable or part thereof) in a vocabulary. Specifically, a method is provided which includes the steps of: (a) transforming each of multiple utterances of the word segment into a respective string of fenemes; (b) defining a set of fenemic Markov model phone machines; (c) determining the best single phone machine $P_1$ for producing the multiple feneme strings; (d) determining the best two phone baseform of the form $P_1P_2$ or $P_2P_1$ for producing the multiple feneme strings; (e) aligning the best two phone baseform against each feneme string; (f) splitting each feneme string into a left portion and a right portion with the left portion corresponding to the first phone machine of the two phone baseform and the right portion corresponding to the second phone machine of the two phone baseform; (g) identifying each left portion as a left substring and each right portion as a right substring; (h) processing the set of left substrings in the same manner as the set of feneme strings corresponding to the multiple utterances including the further step of inhibiting further splitting of a substring when the single phone baseform thereof has a higher probability of producing the substring than does the best two phone baseform; (j) processing the set of right substrings in the same manner as the set of feneme strings corresponding to the multiple utterances, including the further step of inhibiting further splitting of a substring when the single phone baseform thereof has a higher probability of producing the substring then does the best two phone baseform; and (k) concatenating the unsplit single phones in an order corresponding the order of the feneme substrings to which they corrrespond. In a particular embodiment, the method includes the further steps of: (1) aligning the concatenated baseform against each of the feneme strings and identifying, for each phone in the concatenated baseform, the substring in each feneme string which corresponds thereto, the substrings corresponding to a given phone being a set of common substrings; (m) for each set of common substrings, determining the phone machine having the highest joint probability of producing the common substrings; and (n) for each common substring, replacing the phone therefor in the concatenated baseform by the determined phone of highest joint probability; the baseform resulting from the replacing of phones being a refined baseform. If the steps (1) through (n) are repeated until no phones are replaced, a further refined baseform is achieved.

There are other methods of constructing a fenemic baseform for a given word segment (e.g. word). For example, the baseform may be derived from the output of an acoustic processor in response to a single utterance of the given word segment.

Regardless of how a fenemic baseform is constructed, it typically features the benefits of being more detailed and accurate than a phonetic baseform of the same word. Moreover, the fenemic baseform is typically constructed automatically whereas the phonetic baseform is normally constructed manually by a phonetician. However, the fenemic baseform is also typically ten times the length of the phonetic baseform which is a significant computational disadvantage.

The present invention in its most basic form relates to forming composite baseforms of word segments (e.g. words) from previously constructed fenemic baseforms.

The problem of achieving the short length of a phonetic baseform while maintaining accuracy and the ability of constructing baseforms automatically—as with a fenemic baseform—has been a significant one. This problem has been addressed by the present invention which provides for the automatic generation of simple phonetic-type Markov model phone machine baseforms to represent words in a vocabulary. The phonetic-type baseforms are useful in speech recognition. For example, the phonetic-type baseforms are readily employed in the fast approximate match procedure and detailed match procedure outlined above.

(III) Producing an Alphabet of Composite Fenemic Phones

In deriving an alphabet of composite phones, it is assumed that there is a predefined set of N fenemic phones which have been trained using the forward-backward algorithm. (The forward-backward algorithm has been discussed considerably in the literature). Given the set of N fenemic phones, an alphabet of composite phones is derived by performing the following steps:

(1) Select a pair of phones from the current set of phones.

(2) Determine the entropy for each phone in the selected pair, wherein entropy for each phone is defined by the expression:

$$\text{Entropy} = -\Sigma p_i \log_2 p_i$$

the sum being taken over all fenemes (i=1,200) where each $p_i$ is the probability of a particular phone producing the feneme i and where there are 200 different fenemes.

(3) Determine the entropy of a composite phone resulting from the merger of the two phones of the selected pair into a single phone (or corresponding cluster), wherein each output probability associated with the composite phone is the average of the output probabilities of the two phones that are paired.

(4) Determine the loss of phone/feneme mutual information based on an entropy measure for the composite phone and each merged phone according to the expression:

$$\text{Loss} = E_{composite} - (E_{phone1} + E_{phone2})/2$$

The larger the loss of mutual information, the less the composite phone reflects the two paired phones.

(5) Repeat steps (1) through (4) for each pair of fenemic phones.

(6) Select the composite phone representing the smallest loss for a given selected pair of merged phones and replace the two merged phones by the composite phone therefor, thereby reducing the number of phones in the set by one.

(7) Repeat steps (1) through (6) until the number of phones in the set is n, each remaining phone being termed a composite phone.

Preferably the typical 200 phones in the fenemic phone alphabet is reduced to about 50 unique composite phones in the composite phone alphabet.

Each composite phone is preferably represented by a seven-state, thirteen transition Markov model as illustrated in FIG. 3. Each transition has a transition probability corresponding to the likelihood of the transition occurring. Each non-null transition (tr1 through tr10) preferably has a plurality of output probabilities associated therewith, each output probability representing the likelihood of a given feneme being produced at a particular non-null transition.

It is preferably the composite phones of the 50 element set that are used in constructing simplified baseforms as set forth in section (IV). The number and composition of the composite phones in the composite phone alphabet may be selected so as to be similar to a selected phoneme alphabet known in the phonetics art.

(IV) Forming Short Phonetic-type Markov Model Baseforms for Words Automatically In accordance with the present invention, simplified Markov model baseforms are formed in the following way. It is initially presumed that there is a fenemic baseform constructed for each word, each baseform being formed in accordance with one of the above-mentioned methods. Preferably, the fenemic baseform is constructed from multiple utterances and stored in memory. The fenemic baseform for a word will typically be on the order of 60 to 100 fenemes in length.

Figure 24:
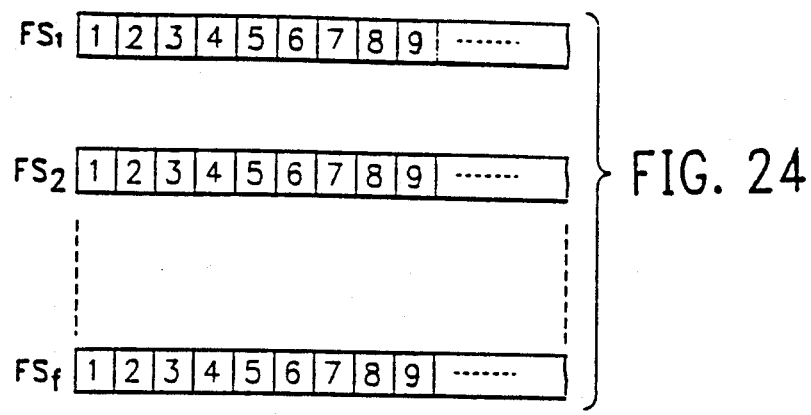
FIG. 24 is an illustration showing multiple feneme strings generated in response to corresponding utterances of a subject word.

Referring to FIG. 24, a subject word is shown represented by f strings of fenemes, each string corresponding to an utterance of the word. Each block 1 through 9 et seq. represents a feneme (or label) generated by an acoustic processor. In the present embodiment, the labels are generated one every centisecond by an acoustic processor. The fenemes in each string are likely to vary with different pronunciations of the subject word.

In accordance with the invention, it is assumed that a fenemic baseform for the subject word is known. The fenemic baseform is shown in FIG. 25. A sequence of fenemic phones—a fenemic baseform—corresponding to the subject word has been previously defined. The fenemic baseform is preferably derived by the method of constructing fenemic baseforms with multiple utterances—as discussed hereinabove. For each of f utterances of the subject word, there is a feneme string $FS_1$ through $FS_f$ defined in terms of fenemes. The fenemes are selected from the alphabet, or set, of 200 fenemes. Typically, one fenemic phone produces one feneme on the average, although the fenemic phone can produce zero, one, or more fenemes when the simple phone model of FIG. 22 is employed. With each unique fenemic phone represented by P with a subscript, the fenemic baseform is shown in FIG. 25.

According to the invention, each composite phone corresponds to one or more of the N phones in the fenemic alphabet, with each fenemic phone corresponding to only one composite phone. The number n is composite phones in the composite phone set is less than the number N of fenemic phones in the fenemic phone set. Preferably, the new alphabet has significantly less elements than the original alphabet, e.g. 40 or 50 elements as compared to on the order of 200 elements in the feneme alphabet. One method of determining the phones in the alphabet is set forth briefly in the previous section.

Given the alphabet of n composite phones, a fenemic baseform for each word in the vocabulary, and a plurality of utterances of the subject word, a simplified baseform for the subject is formed according to the following methodology. First, each utterance is represented by the respective feneme strings $FS_1$ through $FS_f$ as shown in FIG. 24.

Figure 26:
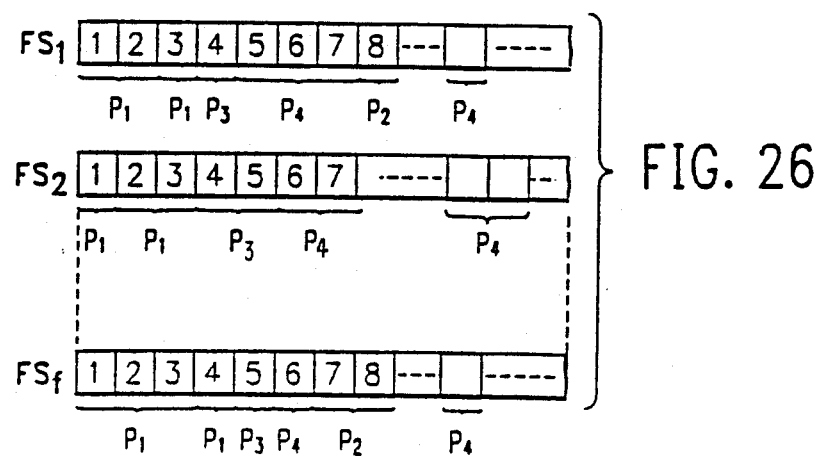
FIG. 26 is an illustration showing the fenemic baseform aligned against each string of fenemes.

Thereafter, each feneme string is aligned against the fenemic baseform of FIG. 25 for the subject word. The result of alignment is illustrated in FIG. 26. In FIG. 26, the fenemic baseform is shown aligned against the fenemes in each string. This alignment is achieved preferably by performing Viterbi alignment, a technique which has been discussed in various articles, such as the aforementioned Jelinek article entitled "Continuous Speech Recognition by Statistical Methods" by F. Jelinek, *Proceedings of the IEEE,* volume 64, pp. 532–556, April 1976.

The subscript of each phone in FIG. 26 identifies the phone from among the 200 phones of the fenemic phone set. Each feneme string, it is noted, is represented by the same sequence of phones, namely phones $P_1 P_1 P_3 P_4 P_2 - - - P_4$. The fenemic phones, it is noted however, align differently against the fenemes in the f strings. For a typical word which lasts about a second, there will be about 100 fenemes and about 100 fenemic phones.

Figure 27:
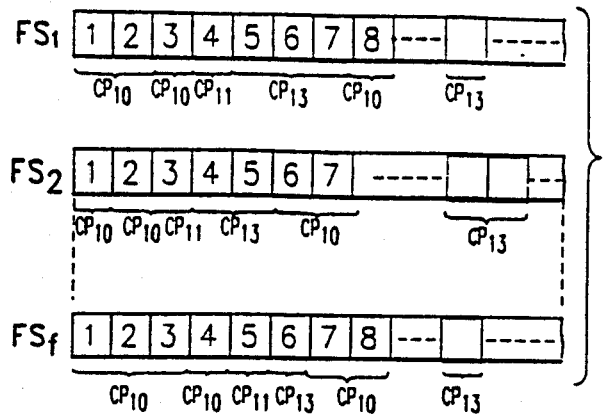
FIG. 27 is an illustration showing each fenemic phone replaced by a composite phone corresponding thereto.

The result of replacing fenemic phones by composite phones is illustrated in FIG. 27. Each phone of FIG. 26 has been replaced by a corresponding composite phone, each of which has the notation $CP_i$ wherein the subscript i identifies a composite phone from among the set of composite phones. Phones $P_1$ and $P_2$ are replaced by $CP_{10}$; phone $P_3$ is replaced by $CP_{11}$; and phone $P_4$ is replaced by $CP_{13}$. The number of composite phones for each string in FIG. 27 is equal to the number of phones in FIG. 26 for each strings $FS_1$ through $FS_f$.

Each composite phone is preferably a seven state phone having thirteen transitions, being similar in structure to the phonetic type of phone discussed hereinabove. In FIG. 27, then, the simple two-state fenemic phones have been replaced by seven-state composite phones.

Figure 28:
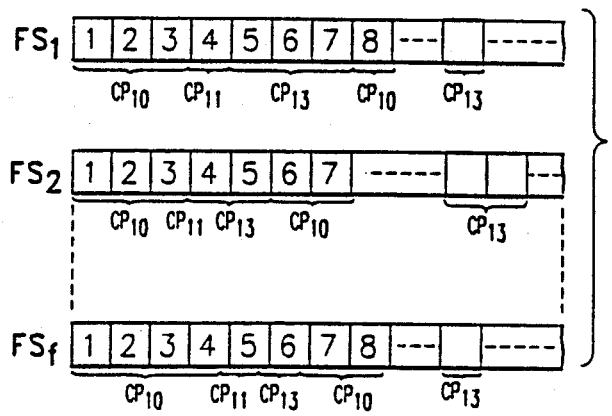
FIG. 28 is an illustration showing a new baseform wherein a common pair of adjacent composite phones associated with each string shown in FIG. 27 is replaced by the same single composite phone.

Turning next to FIG. 28, it is observed that the same two composite phones—namely the first and second from the left—aligned against each feneme string are replaced by a single composite phone. Specifically, the two adjacent composite phones identified as $CP_{10}$ (in FIG. 27) are replaced by the single composite phone $CP_{10}$. Similarly, in FIG. 29, two adjacent composite phones are again replaced by a single composite phone. That is, in FIG. 29, the adjacent composite phones $CP_{11}$ and $CP_{13}$ (of FIG. 28) are replaced by the single composite phone $CP_8$ (in FIG. 29).

Figure 29:
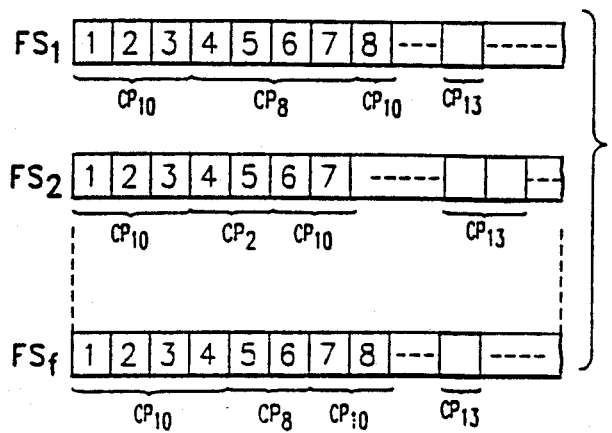
FIG. 29 is an illustration showing a new baseform wherein a common pair of adjacent composite phones associated with each string shown in FIG. 28 is replaced by the same single composite phone.

From FIG. 28 and FIG. 29, it is observed that the number of composite phones is reduced by one with each successive combining of composite phones. As noted hereinbelow, the process of merging two composite phones may continue to achieve a baseform of a particular length.

The processing of merging two composite phones in iterative fashion is based on "nearness." For a given sequence of composite phones, each pair of composite phones is examined to determine the adverse effect that would result from combining the two phones. The pair of phones which, when merged, yields the least adverse effect are considered the "nearest" and are deemed the next candidates for merger. There are various methods for measuring the adverse effect of merger, however the present invention preferably defines "nearness" as MAX(a/A,b/B). "A" and "B" are selectable thresholds which limit the length of the computed baseform. "a" and "b" are defined as follows.

For two composite phones $CP_m$ and $CP_n$ which denote a pair of adjacent composite phones in a sequence thereof, there are feneme series $F_m$ and $F_n$ aligned respectively against the two composite phones. A composte phone $CP_{mn}$ is defined as that composite phone which maximizes the joint probability of producing the fenemes $F_{mn}$. $F_{mn}$ is a concatenation of the two adjacent feneme series $F_m$ and $F_n$. The composite phone $CP_{mn}$ is the phone which replaces the composite phones $CP_m$ and $CP_n$ if these two adjacent phones are the nearest and are to be merged. $L_m$, $L_n$, and $L_{mn}$ denote the respective logarithmic probabilities of $F_m$, $F_n$, and $F_{mn}$ given the composite phones $CP_m$, $CP_n$, and $CP_{mn}$. The factor "a" is then expressed as:

$$a = L_m + L_n - L_{mn}$$

"a" is then a measure of the reduction in probability resulting from the merger of composite phones $CP_m$ and $CP_n$. The greater the adverse effect of merging the two composite phones, the greater will be the value of "a".

It is now noted that the factor "b" is determined by a method known as the paired t-test. The general methodology for the paired t-test is set forth in various texts, such as *Introduction to Probability and Statistics* by W. Mendenhall, 5th Edition, Duxbury Press, Mass., 1979, pp. 294–297. In accordance with the paired t-test, $T_1$ is the t-statistic obtained by performing a paired t-test on the difference in the log probabilities of the fenemes in feneme series $F_m$ when they are produced by (i) composite phone $CP_m$ as compared to (ii) composite phone $CP_{mn}$. $T_2$ is the t-statistic for fenemes in the feneme series $F_n$ when they are produced by (i) composite phone $CP_n$ or (ii) composite phone $CP_{mn}$. For each feneme in feneme series $F_n$, for example, there is a probability of the composite phone $CP_n$ producing the feneme and a probability of the composite phone $CP_{mn}$ producing the feneme. A pairwise comparison between these two probabilities can be made. This process is repeated for each feneme series, it being noted that there is a separate series associated with each word utterance.

$Z_1$ and $Z_2$ denote the values taken by $T_1$ and by $T_2$ after transformation of their t-distributions to a N(0,1) distribution. "b" is then defined as:

$$b = MAX(Z_1, Z_2)$$

"b" is then an indication of how significantly different—in a statistical sense—the feneme probabilities are if the composite phones $CP_m$ and $CP_n$ are merged and replaced by $CP_{mn}$.

By taking the maximum of a/A and b/B for each pair of composite phones, the pair suffering the least adverse effects due to merger is determined. This "nearest" pair can then be merged and replaced by a single composite phone.

The examining of all pairs of composite phones and the merger of the two nearest adjacent composite phones continues until the number of composite phones in the baseform reaches a specified limit or until the distance between the nearest pair of phones exceeds unity, in which case a or b or both exceed their respective thresholds.

If the composite phones are selected to mirror a phonemic alphabet, the resulting sequence of composite phones not only provides an acceptable simplified baseform for speech recognition purposes but also provides an automatically produced description of the word's pronunciation. The latter effect may be used in the field of phonetics.

Referring to FIG. 30, a basic flowchart 8000 of the invention is set forth. In accordance with the flowchart, a subject word is uttered once or, preferably, a plurality of times. With each utterance a string of fenemes is generated (at step 8002). Based on the string or strings of fenemes generated for the subject word, a fenemic word baseform having the highest (joint) probability of producing the string(s) is selected (in step 8004). Baseforms for each word in the vocabulary are previously defined in step 8006. Each string for the subject word is then aligned against the selected baseform in step 8008. In this way, each fenemic phone in the baseform is aligned against corresponding fenemes in each string (for the subject word). Each fenemic phone is then replaced by a corresponding composite phone in step 8009. The following steps are then performed:

1. A pair of adjacent composite phones is selected (step 8010).
2. For each string of fenemes, the substring of fenemes that is aligned against the selected pair of adjacent phones is determined (step 8012).
3. From an alphabet of composite phones defined to have less elements than the alphabet of fenemic phones (step 8013), the composite phone having the highest joint probability of producing the respective determined substrings for all the strings of fenemes is determined (step 8014).
4. The above steps 1 through 3 are repeated for all pairs of adjacent composite phones by means of decision step 8016 and step 8018 of the flowchart. A single composite phone is determined for each pair of adjacent composite phones.
5. The adverse effect of replacing each pair of phones in the baseform by the single composite phone determined therefor is measured (step 8020).
6. The composite phone yielding the least adverse effect replaces the pair of phones corresponding thereto in step 8022 if such adverse effect does not exceed a predefined threshold at step 8024.
7. After the composite phone replaces the pair of phones corresponding thereto, a new baseform of phones is provided in step 8026.
8. Steps 1 through 7 are repeated for the new baseform if the number of phones is not greater than a desired predefined number (see step 8028).

Step 8 is repeated as often as desired to reduce the baseform to a desired length (see step 8030) or until the adverse effect of replacing the pairs of composite phones exceeds a threshold.

The procedure is repeated for each word in the vocabulary until all words have been processed. Hence, for each word in the vocabulary there will be either a stunted baseform of the desired length of composite phones or there is a baseform which cannot be shortened without exceeding an adverse effect threshold.

The resulting stunted baseform is a phonetic-type baseform and may be used in performing detailed acoustic matching and/or fast approximate acoustic matching as described hereinabove. That is, the tree structure 4100 of FIG. 20—which represents phones stored in memory to indicate various sequences of phones—may comprise the stunted baseforms of the present invention. Each phone then comprises a composite phone.

Accordingly, it is contemplated that each word baseform in FIG. 20 represents a sequence of composite phones in a stunted baseform and that each composite phone in the sequence is represented by a phone machine used in performing matching against incoming labels or fenemes.

(V) COMPARATIVE RESULTS

In examining the performance of speech recognition systems employing various types of baseforms, the following results were noted.

First, in a system with a vocabulary of 62 keyboard characters and 600 random utterances thereof, the number of errors for manually determined phonetic baseforms was 28; the number of errors for fenemic baseforms constructed after a single utterance was 14; and the number of errors associated with fenemic baseforms constructed from several utterances was 5.

Second, with a vocabular of 2000 common words of office correspondence and a script of 2070 random utterances, a system employing conventional phonetic baseforms generated 108 errors as compared to 42 errors generated as a result of employing fenemic baseforms constructed from several utterances.

Finally, by employing the "stunted" baseform discussed in Section (IV) the following results were noted. With a vocabulary of 2000 typical business words and a script of 2070 random words, the phonetic baseform had associated therewith 8 errors and the stunted baseform had associated therewith 2 errors with the above described fast approximate acoustic match.

From these results, it is observed that the fenemic baseform based on multiple utterances is more accurate than the standard phonetic baseform and the fenemic baseform generated from one utterance. It is also observed that the stunted baseform is a significant improvement over the conventional phonetic-type baseform. Also from these results, the preferred embodiment is a stunted baseform based on multiple utterances.

(VI) ALTERNATIVE EMBODIMENTS

While the invention has been described with reference to preferred embodiments thereof, it will be understood by those skilled in the art that various changes in form and details may be made without departing from the scope of the invention. For example, the set of composite phones may be determined by techniques other than as disclosed hereinabove. Also the measure of "nearness" as the MAX(a/A,b/B) may be redefined as either a/A or b/B or some other measure having a comparable result.

In addition, it should be recognized that the present method of constructing stunted baseforms is preferably performed based son multiple utterances of a word, the string of fenemes corresponding to each utterance being used in the processing. However, the present invention may also be applied to constructing a stunted baseform from a single utterance of a subject word. If based on a single utterance, the composite phone having the highest probability of producing the fenemes in the one substring is considered in the replacement of a pair of adjacent phones. Because there is only one string, there is no "joint" probability to consider.

Because of variations in pronunciation, the stunted baseform based on multiple utterances is more accurate and preferred.

TABLE 1

THE TWO LETTERS ROUGHLY REPRESENT THE SOUND OF THE ELEMENT.

TWO DIGITS ARE ASSOCIATED WITH VOWELS:

FIRST:   STRESS OF SOUND

SECOND:  CURRENT IDENTIFICATION NUMBER

ONE DIGIT ONLY IS ASSOCIATED WITH CONSONANTS:

SINGLE DIGIT:  CURRENT IDENTIFICATION NUMBER

```
001 AA11    029 BX2-    057 EH02    148 TX5-    176 XX11
002 AA12    030 BX3-    058 EH11    149 TX6-    177 XX12
003 AA13    031 BX4-    059 EH12    150 UH01    178 XX13
004 AA14    032 BX5-    060 EH13    151 UH02    179 XX14
005 AA15    033 BX6-    061 EH14    152 UH11    180 XX15
006 AE11    034 BX7-    062 EH15    153 UH12    181 XX16
007 AE12    035 BX8-    126 RX1-    154 UH13    182 XX17
008 AE13    036 BX9-    127 SH1-    155 UH14    183 XX18
009 AE14    037 DH1-    128 SH2-    156 UU11    184 XX19
010 AF15    038 DH2-    129 SX1-    157 UU12    185 XX2-
011 AW11    039 DQ1-    130 SX2-    158 UXG1    186 XX20
012 AW12    040 DQ2-    131 SX3-    159 UXG2    187 XX21
013 AW13    041 DQ3-    132 SX4-    160 UX11    188 XX22
014 AX11    042 DQ4-    133 SX5-    161 UX12    189 XX23
015 AX12    043 DX1-    134 SX6-    162 UX13    190 XX24
016 AX13    044 DX2-    135 SX7-    163 VX1-    191 XX3-
017 AX14    045 EE01    136 TH1-    164 VX2-    192 XX4-
018 AX15    046 EE02    137 TH2-    165 VX3-    193 XX5-
019 AX16    047 EE11    138 TH3-    166 VX4-    194 XX6-
```

| | | | | | | |
|---|---|---|---|---|---|---|
| 020 AX17 | 048 EE12 | 139 TH4- | 167 WX1- | 195 XX7- | | |
| 021 BQ1- | 049 EE13 | 140 TH5- | 168 WX2- | 196 XX8- | | |
| 022 BQ2- | 050 EE14 | 141 TQ1- | 169 WX3- | 197 XX9- | | |
| 023 BQ3- | 051 EE15 | 142 TQ2- | 170 WX4- | 198 ZX1- | | |
| 024 BQ4- | 052 EE16 | 143 TX3- | 171 WX5- | 199 ZX2- | | |
| 025 BX1- | 053 EE17 | 144 TX1- | 172 WX6- | 200 ZX3- | | |
| 026 BX10 | 054 EE18 | 145 TX2- | 173 WX7- | | | |
| 027 BX11 | 055 EE19 | 146 TX3- | 174 XX1- | | | |
| 028 BX12 | 056 EH01 | 147 TX4- | 175 XX10 | | | |

TABLE 2

PHONE    3    DH       7 NODES.    13 ARCS.    3 ARC LABELS.

| NODE  | 1    | 2   | 3   | 4     | 5     | 6     | 7   |
|-------|------|-----|-----|-------|-------|-------|-----|
| LABEL | 8    | 9   | 10  | 11    | 12    | 13    | 0   |
| COUNT | 31.0 | 1.7 | 1.7 | 119.1 | 115.4 | 120.1 | 0.0 |

| ARC   | 1 -> 2  | 1 -> 4  | 1 -> 7  | 2 -> 3  | 2 -> 7  | 3 -> 7  | 3 -> 7  | 4 -> 4  | 4 -> 5  | 5 -> 5  |
|-------|---------|---------|---------|---------|---------|---------|---------|---------|---------|---------|
| LABEL | 4       | 4       | NULL    | 5       | NULL    | 6       | NULL    | 4       | 5       | 5       |
| PROB  | 0.07243 | 0.92757 | 0.00000 | 0.99259 | 0.00741 | 0.93982 | 0.06018 | 0.75179 | 0.24821 | 0.74389 |

| ARC   | 5 -> 6  | 6 -> 6  | 6 -> 7  |
|-------|---------|---------|---------|
| LABEL | 5       | 6       | 6       |
| PROB  | 0.25611 | 0.75370 | 0.24630 |

| LABEL | 4     | 5     | 6     |
|-------|-------|-------|-------|
| COUNT | 120.8 | 146.4 | 121.6 |
| AE13  |       | 0.091 |       |
| BX10  | 0.030 |       |       |
| BX3   | 0.130 |       |       |
| BX8-  | 0.011 | 0.086 |       |
| DH1-  | 0.020 | 0.040 | 0.013 |
| DQ2-  | 0.011 | 0.052 |       |
| EH01  | 0.010 | 0.014 | 0.167 |
| EH02  |       |       | 0.026 |
| EH11  |       |       | 0.015 |
| EH13  |       |       | 0.012 |
| EH14  |       |       | 0.062 |
| ER14  |       |       | 0.024 |
| FX2-  |       | 0.045 |       |
| FX3-  |       | 0.148 |       |
| GX2-  |       | 0.013 |       |
| GX5-  | 0.148 |       |       |
| GX6-  | 0.246 | 0.023 |       |
| HX1-  |       | 0.011 |       |
| IX04  | 0.011 |       | 0.020 |
| IX13  | 0.025 |       | 0.026 |
| KQ1   |       | 0.014 | 0.024 |
| KX2-  |       | 0.013 |       |
| MX2-  | 0.029 | 0.043 | 0.012 |
| NX3-  | 0.019 |       |       |
| NX5-  | 0.049 |       |       |
| NX6-  |       | 0.017 | 0.012 |
| OU14  |       |       | 0.023 |
| PQ1   | 0.029 | 0.018 |       |
| TH2-  |       | 0.020 |       |
| TQ3-  |       | 0.017 |       |
| UH01  |       |       | 0.020 |
| UH02  | 0.025 | 0.082 | 0.109 |
| UXG2  |       |       | 0.016 |
| UX12  |       |       | 0.062 |
| UX13  |       |       | 0.183 |
| VX1   |       |       | 0.016 |
| VX3-  | 0.041 | 0.283 | 0.016 |
| WX2-  | 0.023 | 0.014 |       |
| XX23  | 0.072 |       |       |
| OTHER | 0.073 | 0.047 | 0.048 |

---

APPENDIX 1

```
""""""""""""""""""""""""""""""""""""""""""""""""""""""""""""""""""""""""""""""""
"                                                                              "
"   Subroutine EXTCOL.                                                         "
"                                                                              "
"   Extends the column                                                         "
"                                                                              "
"   Register Usage:                                                            "
"                                                                              "
```

```
"   SP:  , 1, 2, 3, 4, 5, 6, 7, 8, 9, 10, 11, 12, 13, 14, 15     "
"                                                                "
"   DPX: -4, -3, -2, -1, 0           (DPA = 0)                   "
"   DPY: -4, -3, -2, -1, 0, 1, 2, 3  (DPA = 0)                   "
"                                                                "
"""""""""""""""""""""""""""""""""""""""""""""""""""""""""""""""""

"""""""""""""""""""""""""""""""""""""""""""""""""""""""""""""""""
"  Restore the registers from main memory.                       "
"""""""""""""""""""""""""""""""""""""""""""""""""""""""""""""""""

EXTCOL:   LDMA; DB = SFENPTR; WRTLMN      "get feneme list pointer
          LDMA; DB = STLPPTR; WRTLMN      "get tail prob list pointer
          LDMA; DB = SSTROFF; WRTLMN      "get start offset LDSPI FENPTR; DB < MD           "save feneme list pointer
          LDSPI TLPPTR; DB < MD           "save tail prob list pointer
          LDSPI STROFF; DB < MD           "save start offset LDMA; DB = SSTRROW; WRTLMN      "get start row
          LDMA; DB = SOUTOFF; WRTLMN      "get output offset
          LDMA; DB = SINBNDY; WRTLMN      "get input boundary pointer LDSPI STRROW; DB < MD           "save start row
          LDSPI OUTOFF; DB < MD           "save output offset
          LDSPI INBNDY; DB < MD           "save input boundary pointer LDMA; DB = STIME;   WRTLMN      "get the current time
          LDMA; DB = SSTRLEN; WRTLMN      "get start distribution length
          LDMA; DB = ALEXLEX; WRTLMN      "get lexeme length LDSPI TIME;    DB < MD          "save current time
          LDSPI STRLEN;  DB < MD          "save start distribution length
          LDSPI LOOPCNT; DB < MD          "save lexeme length SUB   STRROW, LOOPCNT           "loop count = lexlen - strrow LDSPI PRMADR; DB = SFENPTR      "put back feneme pointer + 1
          INC   FENPTR; DPX(-3) < SPFN
          MOV   PRMADR, PRMADR; SETMA; MI < DPX(-3)

LDSPI PRMADR; DB = STLPPTR      "put back tail pointer + 1
          INC   TLPPTR; DPX(-3) < SPFN
          MOV   PRMADR, PRMADR; SETMA; MI < DPX(-3)

LDSPI PRMADR; DB = SINBNDY      "put back inbndy + 1
          INC   INBNDY; DPX(-3) < SPFN
          MOV   PRMADR, PRMADR; SETMA; MI < DPX(-3)

LDSPI PRMADR; DB = STIME        "put back time + 1
          INC   TIME;   DPX(-3) < SPFN
          MOV   PRMADR, PRMADR; SETMA; MI < DPX(-3)

"""""""""""""""""""""""""""""""""""""""""""""""""""""""""""""""""
"  Get the next feneme and tail probability.                     "
"""""""""""""""""""""""""""""""""""""""""""""""""""""""""""""""""
```

```
        OUT; DB = PAGE0                    "flip to page zero
        MOV   FENPTR, FENPTR; SETMA        "get next feneme
        MOV   TLPPTR, TLPPTR; SETMA        "get next tail probability
        OUT; DB = PAGE1                    "flip back to page one
        LDSPI FENEME; DB < MD              "save the feneme
        DPY(TPY) < MD                      "save the tail probability
        MOV   FENEME, FENEME; DPX(CFENX) < SPFN LDSPI FENLOK; DB = AFENLOK         "get base addr of feneme lookup
        ADD   FENEME, FENLOK; SETMA        "use feneme to get fenbas
        LDSPI INCOL; DB = ACOLUMN          "get base addr for input col
        LDSPI OUTCOL; DB = ACOLUMN         "get base addr for output col
        LDSPI FENBAS; DB < MD              "pointer into feneme probs ADD   STROFF, INCOL                "incol = start_offset + ...
        ADD   STRROW, INCOL                "        start_row
        ADD   OUTOFF, OUTCOL               "outcol = output_offset + ...
        ADD   STRROW, OUTCOL               "        start_row - 2;

LDSPI TRMLOK; DB = ATRMLOK         "get base addr of tram lookup
        ADD   STRROW, TRMLOK; SETMA        "lookup the tram base ptr
        DEC   OUTCOL                       "outcol... - 1
        DEC   OUTCOL                       "outcol... - 2
        LDSPI TRMPTR; DB < ...             "get starting tram addr
        LDSPI PRMADR; DB   .FFTSZ          "compensate for tram base
        ADD   PRMADR, PRMADR               "which is at 2 x !FFTSZ
        ADD   PRMADR, TRMPTR """""""""""""""""""""""""""""""""""""""""""""""""""""""""""""""""""""""""""""
" Start the pipeline going...                                                "
"""""""""""""""""""""""""""""""""""""""""""""""""""""""""""""""""""""""""""""

MOV   INCOL, INCOL; SETMA          "get col(start_ptr)
        MOV   INBNDY, INBNDY; SETMA        "get inbndy(time) in case
        SUB#  TIME, STRLEN                 "start_length - time
        BLT   OUTSIDE;                     "if <= we are outside inbndy
              DPY(LIY) < MD                "and save col(start_ptr)

INSIDE: FADD  DPY(LIY), MD                 "col() + inbndy(time)
        FADD                               "push the adder
        DPY(LIY) <FA                       "last_input = col + inbndy OUTSIDE: DPY(PROFY) < ZERO                 "zero out the running profile """""""""""""""""""""""""""""""""""""""""""""""""""""""""""""""""""""""""""""
" Start the pipeline going... start first loop                               "
"""""""""""""""""""""""""""""""""""""""""""""""""""""""""""""""""""""""""""""

MOV TRMPTR, TRMPTR; SETTMA         "start transfer of phone num

NOP                                "wait for table memory

LDSPI PHONE; DB < TM;              "save the phone number
            INCTMA                         "increment tramptr ADD FENBAS, PHONE; SETMA           "lookup feneme prob
```

```
        FADD DPY(LIY), ZERO;           "push last_state thru adder
          INCTMA                       "start transfer of null trans FADD;                          "push the adder
          INCTMA;                      "start transfer of phone num
          DPY(SOFAY) < ZERO            "clear 2nd oldest farc
```

```
" Start the pipeline going... do first loop                            "
```

```
        FMUL  TM, FA;                  "null trans * last_input
          INC INCOL; SETMA;            "start transfer of col()
          DPY (LIY) < FA;              "save last input
          FADD DPY(PROFY), FA;         "profile = prof + last_input
          DPX (FENX) < MD FMUL DPX(FENX), DPY(TPY);      "feneme prob * tail prob
          LDSPI PHONE; DB < TM;        "save the phone number
          INCTMA;                      "start trans of self trans
          FADD                         "push the adder FMUL;
          DPY(PROFY) < FA;             "save the running profile
          ADD FENBAS, PHONE; SETMA;    "lookup feneme prob
          DPX(FAX) < ZERO;             "zero out forward arc
          FADD                         "null add FADD  FM, MD;                  "col() + null*last_input
          FMUL TM, DPX(FAX);           "self trans * forward arc
          INCTMA;                      "start transfer of null trans
          DPX(OFAX) < DPY(SOFAY)       "push queue of forward arcs FADD;
          FMUL FM, DPY(LIY);           "last_input * feneme_prob
          INCTMA;                      "start transfer of phone num
          DPY(SOFAY) < DPX(FAX)        "zero out 2nd oldest farc
```

```
" Loop for index = 1 to loopcnt (= lexeme_length - start_row)      "
```

```
EXTLOOP:  FMUL  TM, FA;                "null trans * last_input
          INC INCOL; SETMA;            "start transfer of col()
          DPY (LIY) < FA;              "save last input
          FADD DPY(PROFY), FA;         "profile = prof + last_input
          DPX (FENX) < MD FMUL DPX(FENX), DPY(TPY);      "feneme prob * tail prob
          DPY(SELFY) < FM;             "save self arc
          LDSPI PHONE; DB < TM;        "save the phone number
          INCTMA;                      "start trans of self trans
          FADD                         "push the adder
        FMUL;
          DPY(PROFY) < FA;             "save the running profile
          ADD FENBAS, PHONE; SETMA;    "lookup feneme prob
```

```
        DPX(FAX) < FM;                  "save forward arc
        FADD DPY(SELFY), DPX(OFAX)      "self + oldest_farc FADD  FM, MD;                       "col() + null*last_input
        FMUL TM, DPX(FAX);              "self trans * forward arc
        INCTMA;                         "start transfer of null trans
        DEC LOOPCNT;                    "decrement the loop count
        DPX(OFAX) < DPY(SOFAY)          "push queue of forward arcs FADD;
        FMUL FM, DPY(LIY);              "last_input * feneme_prob
        INCTMA;                         "start transfer of phone num
        INC OUTCOL; SETMA;              "put out next_output
        MI < FA;
        DPY(SOFAY) < DPX(FAX);          "push forward arc queue
        BGT EXTLOOP                     "keep looping until done(BNE)
```

```
" Trail out of loop...                                                      "
```

```
        FMUL TM, FA;                    "calculate last forward arc
        DPY (LIY) < FA;                 "save last input
        FADD DPY(PROFY), FA             "profile = prof + last_input FMUL;                               "push the multiplier
        DPY(SELFY) < FM;                "save self arc
        INCTMA;                         "start trans of self trans
        FADD                            "push the adder FMUL;
        DPY(PROFY) < FA;                "save the running profile
        DPX(FAX) < FM;                  "save forward arc
        FADD DPY(SELFY), DPX(OFAX)      "self + oldest_farc FADD;                               "push the adder
        FMUL TM, DPX(FAX);              "self trans * forward arc
        DPX(OFAX) < DPY(SOFAY)          "push queue of forward arcs FMUL;                               "push the multiplier
        INC OUTCOL; SETMA;              "put out next_output
        MI < FA;
        DPY(SOFAY) < DPX(FAX)           "push forward arc queue
```

```
" Push last outputs out of loop...                                          "
```

```
        FMUL                            "push the multiplier

FADD FM, DPX(OFAX)              "self + oldest_farc

FADD;                           "push the adder
        DPX(OFAX) < DPY(SOFAY)          "push queue of forward arcs INC OUTCOL; SETMA;              "put out next_output
```

```
            MI < FA;
            DPY(SOFAY) < DPX(FAX)           "push forward arc queue INC OUTCOL; SETMA;
            MI < DPX(OFAX)                  "push out oldest forward arc RETURN                             "finished EXTCOL
```

APPENDIX 2

```
"""""""""""""""""""""""""""""""""""""""""""""""""""""""""""""""""""""""""""
"                                                                          "
" SUBROUTINE APFM                                                          "
"                                                                          "
" This program implements the acoustic Fast Match in the FPS Array         "
" Processor. This is the modified Fast Match that runs without             "
" explicit length distributions.                                           "
"                                                                          "
"""""""""""""""""""""""""""""""""""""""""""""""""""""""""""""""""""""""""""

"""""""""""""""""""""""""""""""""""""""""""""""""""""""""""""""""""""""""""
"                                                                          "
" SUBROUTINE EVALPP                                                        "
"                                                                          "
" This routine performs the actual fast match calculation for the          "
" current lattice node. The main program only calls this routine to        "
" evaluate valid nodes - not the null nodes that correspond to leaves.     "
"                                                                          "
"""""""""""""""""""""""""""""""""""""""""""""""""""""""""""""""""""""""""""

"""""""""""""""""""""""""""""""""""""""""""""""""""""""""""""""""""""""""""
"                                                                          "
" Initializations... given the current lattice node number, look up        "
" the corresponding clink number, set up match parameters such as          "
" the length of the start time distribution, pointers to the start         "
" time distribution in the boundary stacks, and the offset into the        "
" feneme stream.                                                           "
"                                                                          "
"""""""""""""""""""""""""""""""""""""""""""""""""""""""""""""""""""""""""""

"""""""""""""""""""""""""""""""""""""""""""""""""""""""""""""""""""""""""""
"                                                                          "
" Initial_zeroes = 4:                                                      "
"                                                                          "
" Pad the start time distribution with 4 zeroes, increase SDLEN by 4       "
" to simplify looping after start time distribution ends.                  "
"                                                                          "
" Initialize output_distribution (time - 1), output_sum, set feneme        "
" prob for first time slice equal to zero by clearing the multiplier.      "
"                                                                          "
" output_distribution (0)   = 0.0;                                         "
" output_sum                = 0.0;                                         "
" feneme_prob               = 0.0;                                         "
" state_1                   = 0.0;                                         "
" state_2                   = 0.0;                                         "
```

```
"   state_3                         = 0.0;                                                      "
"   state_4                         = 0.0;                                                      "
"                                                                                               "
"""""""""""""""""""""""""""""""""""""""""""""""""""""""""""""""""""""""""""""""""""""""""""""""""

ZERO4:     ADD# SDARY, SDLEN;              "point to last sample in the
             SETMA;                        "start time distribution
             DPX(LASTX) < ZERO;            "zero the last output sample
             DPY(OSY)   < ZERO             "zero the output sum INCMA;                          "last sample + 1
             MI < ZERO;                    "pad out with zero
             DPY(ST1Y) < ZERO;             "state_1 = 0.0
             INC SDLEN                     "sdlen = sdlen + 1

INCMA;                          "last sample + 2
             MI < ZERO;                    "pad out with zero
             DPY(ST2Y) < ZERO;             "state_2 = 0.0
             INC SDLEN                     "sdlen = sdlen + 2

INCMA;                          "last sample + 3
             MI < ZERO;                    "pad out with zero
             DPY(ST3Y) < ZERO;             "state_3 = 0.0
             INC SDLEN                     "sdlen = sdlen + 3

INCMA;                          "last sample + 4
             MI < ZERO;                    "pad out with zero
             DPY(ST4Y) < ZERO;             "state_4 = 0.0
             INC SDLEN                     "sdlen = sdlen + 4

CLR TIME;                       "output time counter = 0
             FMUL DPX(LASTX), DPY(OSY)     "clear the multiplier MOV SDLEN, LOPLIM;              "1st loop limit = sdlen
             FMUL                          "push the multiplier
```

```
"                                                                                               "
"  First loop: initial_zeroes = 4                                                               "
"                                                                                               "
"  Calculate output distribution value for current time, update output                          "
"  sum, calculate feneme probability for the next time slice.                                   "
"                                                                                               "
"  do time = 1 to start_time_length + 4;                                                        "
"    output_distribution (time) =                                                               "
"        feneme_prob * (output_distribution (time - 1) + state_1);                              "
"    output_sum  = output_sum + output_distribution (time);                                     "
"    state_1     = state_2 * feneme_prob;                                                       "
"    state_2     = state_3 * feneme_prob;                                                       "
"    state_3     = state_4 * feneme_prob;                                                       "
"    state_4     = st_array (time);                                                             "
"    feneme_prob = fd_array (local_buffer(first_feneme + time))                                 "
"                  * tail_buffer (first_feneme + time);                                         "
"  end;                                                                                         "
"                                                                                               "
```

```
L41:        INC LFARY;                          "start transfer of next
            SETMA;                              "feneme symbol from stream
            FADD DPX(LASTX), DPY(ST1Y);         "add last output + state_1
            FMUL                                "push the multiplier INC TPARY;                          "start transfer of next
            SETMA;                              "tail probability
            FMUL FM, DPY(ST2Y);                 "state_2 * feneme_prob
            FADD;                               "push the adder pipeline
            DPX(FPX) < FM                       "save feneme_prob INC SDARY;                          "transfer next starting pt
            SETMA;
            FMUL DPX(FPX), FA                   "(last+st1) * feneme_prob
            LDSPI FDOFF;                        "get the current feneme
            DB = MD;                            "symbol from bus
            FMUL DPX(FPX), DPY(ST3Y)            "state_3 * feneme_prob ADD# FDOFF, FDARY;                  "start transfer of next
            SETMA;                              "feneme probability
            DPX(TPX) < MD;                      "save next tail probability
            FMUL DPX(FPX), DPY(ST4Y);           "state_4 * feneme_prob
            DPY(ST1Y) < FM                      "state_1 = state_2 * fp FMUL;                               "push the multiplier
            DPX(LASTX) < FM;                    "save output sample
            DPY(ST4Y) < MD                      "store next input sample INC TIME;                           "update the time counter
            FMUL;                               "push the multiplier
            DPY(ST2Y) < FM;                     "state_2 = state_3 * fp
            FADD DPX(LASTX), DPY(OSY)           "add output to output_sum DEC LOPLIM;                         "at end of loop?
            FMUL DPX(TPX), MD;                  "feneme * tail prob
            DPY(ST3Y) < FM;                     "state_3 = state_4 * fp
            FADD                                "push the adder BGT L41;                            "keep looping if not done
            FMUL;                               "push the multiplier
            DPY(OSY) < FA;                      "save output_sum
            INCTMA;                             "update pointer to scratch
            DB = DPX(LASTX);                    "area for output dist, save
            OUT                                 "the output sample
```

```
"""""""""""""""""""""""""""""""""""""""""""""""""""""""""""""""""""""""""""""""
"                                                                             "
" Second loop:                                                                "
"                                                                             "
" Time is now equal to start_time_length + initial_zeroes, so the             "
" start time distribution has ended and all internal states are               "
" equal to zero.  Therefore, this section of code is common to all            "
" cases of initial zeroes.                                                    "
"                                                                             "
" Loop until time_limit (start_time_length + ld_length - 1), or until         "
" the output falls below loop_cutoff.                                         "
```

```
"
"
"  do time = start_time_length + 1 + initial_zeroes to time_limit        "
"         while (output_distribution (time) >= loop_cutoff);             "
"                                                                        "
"    output_distribution (time) =                                        "
"          feneme_prob * output_distribution (time - 1);                 "
"    output_sum  = output_sum + output_distribution (time);              "
"    feneme_prob = fd_array (local_buffer(first_feneme + time))          "
"               * tail_buffer (first_feneme + time);                     "
"  end;                                                                  "
"                                                                        "
""""""""""""""""""""""""""""""""""""""""""""""""""""""""""""""""""""""""""
```

```
EVAL2:      MOV LDLEN, LOPLIM              "loop limit = ld_len - 1
            SUB INTZERO, LOPLIM            " - initial_zeroes
            DEC LOPLIM
            BGT L42                        "if looplimit > 0, do it
            JMP EVOUT                      "otherwise, jump to exit L42:        INC LFARY;                     "start transfer of next
              SETMA;                       "feneme symbol from stream
              FMUL                         "push the multiplier INC TPARY;                     "get next tail prob
              SETMA;                       "from buffer
              FMUL FM, DPX(LASTX)          "last = last * feneme_prob FMUL                           "push the multiplier LDSPI FDOFF;                   "get feneme symbol
              DB = MD;                     "from input stream
              FMUL                         "push the multiplier ADD# FDOFF, FDARY;             "use feneme as pointer into
              SETMA;                       "probability array
              DPX(TPX) < MD;               "save the tail probability
              FSUBR FM, DPY(LCY)           "compare output to cutoff FADD FM, DPY(OSY);             "add output into output_sum
              DPX(LASTX)<FM                "save output in register INC TIME;                      "increment time counter
              FADD                         "push the adder DEC LOPLIM;                    "see if we are done yet
              FMUL DPX(TPX), MD;           "feneme * tail probability
              BFGE EVOUT;                  "quit if output < cutoff
              DPY(OSY)<FA                  "save output sum BGT L42;                       "if not done, keep looping
              FMUL;                        "push the multiplier
              INCTMA;                      "update pointer to scratch
              DB = DPX(LASTX);             "area for output dist, save
              OUT                          "the output sample
```

We claim:

1. In a system that (i) generates in an acoustic processor a string of fenemes in response to speech input, (ii) defines each word in a vocabulary by a respective fenemic baseform comprising a sequence of Markov model fenemic phones each of which relate to a feneme generatable by the acoustic processor, and (iii) defines an alphabet of composite Markov model phonetic phones each of which relates to a phonetic element and each of which correlates to at least one fenemic phone, a method of selecting Markov model phones for inclusion in a stunted baseform constructed of a sequence of phonetic phones, the method comprising the steps of:

(a) generating a respective string of fenemes in response to an utterance of a selected word;

(b) selecting the fenemic baseform having the highest probability of producing the string of fenemes and aligning the selected fenemic baseform against the generated string of fenemes;

(c) replacing each fenemic phone in the fenemic baseform by a composite phone corresponding thereto, thereby forming a composite phone baseform;

(d) selecting a pair of adjacent composite phones in the composite phone baseform;

(e) determining a substring of fenemes aligned against the selected pair of adjacent phones;

(f) computing, for each composite phone in the composite phone alphabet, a respective probability of producing the determined substring of fenemes;

(g) selecting the composite phone having the highest probability of having produced the determined substring;

(h) repeating steps (d) through (g) for each pair of adjacent phones in the composite phone baseform; and (j) replacing at least one pair of adjacent composite phones by the selected composite phone corresponding thereto.

2. The method of claim 1 comprising the further step of:

(k) measuring, for each pair of adjacent phones, an adverse effect on the probability of producing fenemes in the determined substring in the event that the pair of adjacent composite phones aligned against the determined substring is replaced by the selected composite phone corresponding thereto;

wherein step (j) includes the steps of choosing for replacement only those selected composite phones having adverse effect within prescribed limitations.

3. The method of claim 2 comprising the further step of:

(m) defining a new baseform following step (k) and repeating steps (d) through (k) with the new baseform; and (n) repeating step (m) until the defined new baseform is reduced to a predefined number of composite phones, thereby providing a stunted baseform.

4. The method of claim 3 wherein step (k) includes the step of:

(p) replacing only one pair of adjacent phones by the composite phone corresponding thereto, the replacing of said one pair of adjacent phones by the composite phone corresponding thereto yielding the least measured adverse effect of all replacements;

the new baseform in step (m) having one less phone than the baseform prior to the replacing step (p).

5. The method of claim 4 wherein the measuring of adverse effect includes the step of:

(q) measuring the reduction in probability between (i) the probability of each of the adjacent phones producing the fenemes aligned thereagainst and (ii) the probability of the single composite phone producing the fenemes aligned against both adjacent phones.

6. The method of claim 5 wherein step (q) comprises the steps of:

(r) determining a probability of the first phone in a given adjacent pair of phones producing the fenemes aligned thereagainst as $L_m$ and determining the probability of the second phone in the given pair of adjacent phones producing the fenemes aligned thereagainst as $L_n$;

determining the probability of the composite phone corresponding to the given pair of adjacent phones producing the substring of fenemes aligned against the given pair of adjacent phones as $L_{mn}$; and comparing the probabilities $L_m$ and $L_n$ with the probability $L_{mn}$.

7. The method of claim 6 wherein $L_m$, $L_n$, and $L_{mn}$ are logarithmic probabilities and the measured reduction in probability is:

$$L_m + L_n - L_{mn}$$

8. The method of claim 3 wherein the alphabet of composite phones represents a phoneme alphabet and wherein the stunted baseform of step (n) provides a phonetic representation of the word corresponding to the constructed baseform.

9. In a system which processes speech, a method of automatically constructing for each word in a vocabulary a stunted baseform, the method comprising the steps of:

(a) defining each word in the vocabulary as a respective fenemic baseform formed of a sequence of fenemic phones, each fenemic phone being from an alphabet of N fenemic phones, and entering each fenemic baseform into storage;

(b) defining an alphabet of composite phones, each composite phone being associated with at least one fenemic phone;

(c) generating, in an acoustic processor which associates one feneme in a fixed set of fenemes to each successive interval of speech in an utterance of speech, a plurality of feneme strings for a selected word, each feneme string being generated in response to an utterance of the selected word;

(d) selecting the stored fenemic baseform having the highest joint probability of having produced all the generated feneme strings for the selected word and aligning the selected fenemic baseform against each of the feneme strings;

(e) replacing each fenemic phone by a composite phone corresponding thereto, thereby forming a composite phone baseform;

(f) selecting a pair of adjacent phones in the composite phone baseform;

(g) for each feneme string, aligning a substring of fenemes against the selected pair of adjacent phones;

(h) selecting a composite phone for a given pair of adjacent composite phones which has the highest joint probability of producing all of the substrings aligned against said given pair of adjacent composite phones;

(j) repeating steps (f) through (h) for all pairs of adjacent phones, thereby providing a selected composite phone for each adjacent pair of phones in the composite phone baseform; and (k) determining which selected composite phone yields the least adverse effect on the probability of producing fenemes in the aligned substring therefor in the event that the pair of adjacent phones is replaced by the selected composite phone corresponding thereto.

10. The method of claim 9 comprising the further step of:

(m) setting an adverse effect threshold and determining if the set threshold is exceeded if the composite phone yielding the least adverse effect replaces the adjacent phones corresponding thereto.

11. The method of claim 10 comprising the further step of:

(n) replacing the selected composite phone yielding the least adverse effect for the adjacent phones corresponding thereto, thereby forming a new baseform.

12. The method of claim 11 comprising the further step of:

(p) setting a desired length of phones for the stunted baseform; and (r) repeating steps (f) through (n) until either the length of phones in the baseform is reduced to the desired length or until the adverse effect threshold is exceeded by replacing an adjacent pair of phones by the selected composite phone which yields the least adverse effect upon replacement, step (n) being omitted if the threshold in step (m) is exceeded.

13. The method of claim 12 wherein step (k) includes the step of:

(t) performing a paired t-test which, for each substring aligned against the selected pair of adjacent phones, includes the step of comparing (i) the probability of producing a given feneme in an aligned substring by the adjacent phone aligned thereagainst with (ii) the probability of producing the given feneme in the substring by the selected composite phone.

14. The method of claim 13 comprising the further step of:

(u) repeating step (t) for each feneme in each substring aligned against the selected pair of adjacent phones.

15. The method of claim 12 wherein step (k) includes the steps of:

(v) measuring the adverse effect as the value of the probability reduction resulting from replacing an adjacent pair of phones by the selected composite phone corresponding thereto.

16. The method of claim 12 comprising the further step of:

(w) repeating steps (c) through (r) for each word in the vocabulary.

17. The method of claim 16 in a speech recognition system, the method including the further step of:

(x) storing the stunted baseforms in a memory of the speech recognition system for use in performing acoustic matching.

18. The method of claim 9 wherein step (b) includes the steps of:

(aa) selecting a pair of phones from the alphabet of fenemic phones;

(bb) determining the entropy for each phone in the selected pair, wherein entropy for each phone is defined by the expression:

$$\text{entropy} = -\Sigma p_i \log_2 p_i$$

the sum being taken over all fenemes (i=1,N) where N is the number of fenemes in the alphabet and where each $p_i$ is the probability of a particular phone producing the feneme i;

(cc) determining the entropy of a composite phone resulting from the merger of the two phones of the selected pair into a single phone wherein each output probability associated with the composite phone is the average of the output probabilities of the two phones that are paired;

(dd) determining the loss of phone/feneme mutual information based on an entropy measure for the composite phone and each merged phone according to the expression:

$$\text{Loss} = E_{composite} - (E_{phone1} + E_{phone2})/2$$

wherein the larger the loss of mutual information, the less the composite phone reflects the two paired phones;

(ee) repeating steps (aa) through (dd) for each pair of fenemic phones; and (ff) selecting the composite phone representing the smallest loss for a given selected pair of merged phones; and (gg) repeating steps (aa) through (ff) until the number of composite phones in the composite phone alphabet is n, where n is an integer less than N.

19. In a speech recognition system including means for performing acoustic matching between (i) stunted word baseforms each comprised of a sequence of Markov model phones and (ii) a string of fenemes generated by an acoustic processor in response to speech input, a method of automatically constructing for each word in a vocabulary a stunted baseform used in the acoustic matching, the method comprising the steps of:

(a) defining each word in the vocabulary as a respective fenemic baseform formed of a sequence of fenemic phones, each fenemic phone being from an alphabet of N fenemic phones, and entering each fenemic baseform into storage;

(b) defining an alphabet of composite phones, each composite phone being associated with at least one fenemic phone;

(c) generating a plurality of feneme strings for a selected word, each feneme string being generated in response to an utterance of the selected word;

(d) selecting the stored fenemic baseform having the highest joint probability of producing all the generated feneme strings for the subject word and aligning the fenemic phones of the selected fenemic baseform against each of the feneme strings;

(e) replacing each fenemic phone by a composite phone corresponding thereto, thereby forming a composite phone baseform;

(f) selecting a pair of adjacent composite phones in the composite phone baseform;

(g) for each generated feneme string, aligning a substring of the generated feneme string against the selected pair of adjacent composite phones;

(h) selecting the composite phone in the alphabet thereof which has the highest joint probability of producing all of the determined substrings;

(j) repeating steps (f) through (h) for all pairs of adjacent composite phones, thereby providing a selected composite phone for each adjacent pair of composite phones in the baseform;

(k) determining which single composite phone yields the least adverse effect when replacing the adjacent pair of composite phones corresponding thereto; and (m) replacing the selected composite phone yielding the least adverse effect for the adjacent composite phones corresponding thereto, thereby forming a new baseform.

20. The method of claim 19 comprising the further step of:

(n) setting a desired length of phones for the stunted baseform; and (p) repeating steps (f) through (m) until either the length of phones in the baseform is reduced to the desired length or until the adverse effect threshold is exceeded by replacing an adjacent pair of phones by the selected composite phone which yields the least adverse effect upon replacement, step (m) being omitted if an adverse effect threshold is exceeded.

21. The method of claim 20 comprising the further step of:

(q) arranging the stunted baseforms for the words in the vocabulary into a tree structure in storage portion of the speech recognition system.

22. In a system that (i) defines each word in a vocabulary by a fenemic baseform of fenemic phones, (ii) defines an alphabet of composite phones each of which corresponds to at least one fenemic phone, and (iii) generates a string of fenemes in response to speech input, a method of constructing a stunted phonetic-type word baseform of phones comprising the step of:

converting a fenemic phone word baseform into a stunted word baseform of composite phones including the steps of:

(a) replacing each fenemic phone in the fenemic phone word baseform by the composite phone corresponding thereto; and (b) replacing at least one pair of adjacent composite phones by a single composite phone where the adverse effect of the replacing is below a predefined threshold.

23. The method of claim 22 wherein step (b) includes the steps of replacing one pair of adjacent composite phones by a single composite phone, wherein said replacing results in less adverse effect than the replacing of any other two adjacent compozsite phones by a single composite phone.

24. The method of claim 23 comprising the further step of:

(c) defining a new baseform following step (b) and repeating steps (a) and (b) until a word baseform of a given length is achieved.

* * * * *